United States Patent
Lakhani et al.

(10) Patent No.: US 11,093,626 B2
(45) Date of Patent: Aug. 17, 2021

(54) SECURITY SYSTEMS AND METHODS FOR CONTINUOUS AUTHORIZED ACCESS TO RESTRICTED ACCESS LOCATIONS

(71) Applicant: IDEE Limited, London (GB)

(72) Inventors: Al Lakhani, Munich (DE); Dennis Kelechi Okpara, London (GB)

(73) Assignee: iDee Limited, London (GB)

(*) Notice: Subject to any disclaimer, the term of this patent is extended or adjusted under 35 U.S.C. 154(b) by 182 days.

(21) Appl. No.: 15/776,612

(22) PCT Filed: Nov. 14, 2016

(86) PCT No.: PCT/IB2016/001722
§ 371 (c)(1),
(2) Date: May 16, 2018

(87) PCT Pub. No.: WO2017/085546
PCT Pub. Date: May 26, 2017

(65) Prior Publication Data
US 2018/0332033 A1 Nov. 15, 2018

Related U.S. Application Data

(60) Provisional application No. 62/256,420, filed on Nov. 17, 2015.

(51) Int. Cl.
*G06F 21/00* (2013.01)
*H04L 29/06* (2006.01)
(Continued)

(52) U.S. Cl.
CPC .......... *G06F 21/6209* (2013.01); *G06F 21/31* (2013.01); *G06F 21/35* (2013.01);
(Continued)

(58) Field of Classification Search
CPC ...... G06F 21/31; G06F 21/35; G06F 21/6209; G06F 21/44; G06F 2221/2117; G06F 2221/2139; H04L 63/0853
See application file for complete search history.

(56) References Cited

U.S. PATENT DOCUMENTS

| 7,536,722 B1 | 5/2009 | Saltz et al. |
| 7,748,031 B2 | 6/2010 | Gonzalez et al. |

(Continued)

FOREIGN PATENT DOCUMENTS

| CA | 2878269 A1 | 9/2015 |
| WO | 2015/071707 | 5/2015 |

OTHER PUBLICATIONS

International Preliminary Report on Patentability from corresponding International Application No. PCT/IB2016/001722, dated May 31, 2018.

(Continued)

*Primary Examiner* — Anthony D Brown
*Assistant Examiner* — Rodman Alexander Mahmoudi
(74) *Attorney, Agent, or Firm* — DLA Piper LLP (US)

(57) ABSTRACT

Systems and methods for authorized access to restricted access locations. A first and/or second device includes a secure storage storing security credentials associated with a user for authorized access to restricted access locations. The second device is associated with a unique identifier. A processor of the first device is configured to: detect a presence of the second device within a predetermined proximity range of the first device; establish a communication channel between the first and second devices; receive the unique device identifier from the second device via the communication channel; determine whether the received unique device identifier matches a predetermined identifier in the secure storage, to validate the second device; determine whether the first and second devices maintain a pre- (Continued)

defined connection state; and permit access to the security credentials stored on the secure storage when the second device is validated and the predefined connection state is maintained.

24 Claims, 18 Drawing Sheets

(51) Int. Cl.
| | |
|---|---|
| *G06F 21/62* | (2013.01) |
| *G06F 21/44* | (2013.01) |
| *G06F 21/31* | (2013.01) |
| *G06F 21/35* | (2013.01) |

(52) U.S. Cl.
CPC .......... *G06F 21/44* (2013.01); *H04L 63/0853* (2013.01); *G06F 2221/2117* (2013.01); *G06F 2221/2139* (2013.01)

(56) References Cited

U.S. PATENT DOCUMENTS

| | | | |
|---|---|---|---|
| 8,045,961 B2 | 10/2011 | Ayed et al. | |
| 8,112,066 B2 | 2/2012 | Ayed | |
| 8,190,129 B2 | 5/2012 | Ayed | |
| 8,245,052 B2 | 8/2012 | Bjorn | |
| 8,245,292 B2 | 8/2012 | Buer | |
| 8,468,582 B2 | 6/2013 | Kuang et al. | |
| 8,498,618 B2 | 7/2013 | Ayed | |
| 8,548,208 B2 | 10/2013 | Schultz | |
| 8,595,810 B1 | 11/2013 | Ayed | |
| 8,625,796 B1 | 1/2014 | Ayed | |
| 8,646,056 B2 | 2/2014 | Poplett | |
| 8,739,264 B1 | 5/2014 | Eddings et al. | |
| 8,745,709 B2 | 6/2014 | Narendra et al. | |
| 8,806,205 B2 | 8/2014 | Metke et al. | |
| 8,869,263 B2 | 10/2014 | Pasquero et al. | |
| 8,898,450 B2 | 11/2014 | Harjanto et al. | |
| 8,928,587 B1 | 1/2015 | Smus | |
| 8,955,067 B2 | 2/2015 | Chermside | |
| 8,959,353 B2 | 2/2015 | Leoutsarakos et al. | |
| 8,994,498 B2 | 3/2015 | Agrafioti et al. | |
| 9,032,498 B1 | 5/2015 | Ayed | |
| 9,032,501 B1 | 5/2015 | Martin et al. | |
| 9,038,195 B2 | 5/2015 | Satpathy et al. | |
| 9,083,703 B2 | 7/2015 | Fiducia et al. | |
| 9,084,284 B1 | 7/2015 | Shipley et al. | |
| 9,104,853 B2 | 8/2015 | Mathur et al. | |
| 9,135,425 B2 | 9/2015 | Yau | |
| 9,210,133 B2 | 12/2015 | Yau | |
| 9,210,166 B2 | 12/2015 | Sama | |
| 9,301,139 B2 | 3/2016 | Korgaonkar | |
| 9,342,674 B2 | 5/2016 | Abdallah et al. | |
| 9,363,251 B2 | 6/2016 | Morikuni et al. | |
| 9,515,958 B2 | 12/2016 | Satpathy et al. | |
| 9,520,918 B2 | 12/2016 | Adrangi et al. | |
| 9,990,055 B2* | 6/2018 | Seo | G06F 3/0487 |
| 2002/0109580 A1 | 8/2002 | Shreve et al. | |
| 2003/0046228 A1 | 3/2003 | Berney | |
| 2003/0236991 A1 | 12/2003 | Letsinger | |
| 2006/0206723 A1 | 9/2006 | Gil et al. | |
| 2009/0146947 A1 | 6/2009 | Ng | |
| 2009/0177892 A1 | 7/2009 | Steeves et al. | |
| 2009/0271629 A1 | 10/2009 | Michaud | |
| 2009/0312898 A1* | 12/2009 | Hashimoto | G05B 19/0428 701/29.1 |
| 2010/0022217 A1 | 1/2010 | Ketari | |
| 2010/0250440 A1 | 9/2010 | Wang et al. | |
| 2011/0153855 A1* | 6/2011 | Kim | H04L 63/1441 709/229 |
| 2011/0314539 A1 | 12/2011 | Horton | |
| 2013/0227664 A1 | 8/2013 | McKay | |
| 2014/0208112 A1 | 7/2014 | McDonald et al. | |
| 2014/0279528 A1 | 9/2014 | Slaby et al. | |
| 2014/0282878 A1 | 9/2014 | Sergey et al. | |
| 2014/0380451 A1* | 12/2014 | Kim | G06F 21/35 726/9 |
| 2015/0039892 A1 | 2/2015 | Fujita et al. | |
| 2015/0039908 A1 | 2/2015 | Lee et al. | |
| 2015/0040203 A1 | 2/2015 | Qian | |
| 2015/0067824 A1 | 3/2015 | Chatterton et al. | |
| 2015/0074826 A1 | 3/2015 | Shuto | |
| 2015/0113608 A1 | 4/2015 | Chermside | |
| 2015/0149310 A1 | 5/2015 | He et al. | |
| 2015/0237052 A1 | 8/2015 | Brique et al. | |
| 2015/0281227 A1 | 10/2015 | Ivey et al. | |
| 2016/0014116 A1 | 1/2016 | Babbidge et al. | |
| 2016/0050321 A1 | 2/2016 | Tassone et al. | |
| 2016/0057619 A1* | 2/2016 | Lopez | G06Q 20/382 380/247 |
| 2016/0197914 A1 | 7/2016 | Oberheide et al. | |
| 2016/0248764 A1 | 8/2016 | Morikuni et al. | |
| 2016/0261411 A1 | 9/2016 | Yau et al. | |
| 2016/0373430 A1 | 12/2016 | Bhat et al. | |
| 2017/0026379 A1 | 1/2017 | Lu et al. | |
| 2017/0085498 A1 | 3/2017 | Satpathy et al. | |

OTHER PUBLICATIONS

International Preliminary Report on Patentability from corresponding International Application No. PCT/IB2016/001719, dated May 31, 2018.
International Search Report and Written Opinion from corresponding International Application No. PCT/IB2016/001722, dated Apr. 5, 2017.
Non-Final Office Action dated Nov. 14, 2019, from corresponding U.S. Appl. No. 15/776,625.
Urien et al., "Towards a Secure Cloud of Secure Elements Concepts and Experiments with NFC Mobiles", International Conference on Collaboration Technologies and Systems, IEEE 2013, pp. 166-173, May 2013.
Notice of Allowance and Fees Due from corresponding U.S. Appl. No. 15/776,625 dated Mar. 12, 2020.
Communication pursuant to Article 94(3) EPC from counterpart EP Application No. 16825547.9 dated Jun. 17, 2020.
Communication pursuant to Article 94(3) EPC from corresponding EP Application No. 16825548.7 dated Jun. 18, 2020.

* cited by examiner

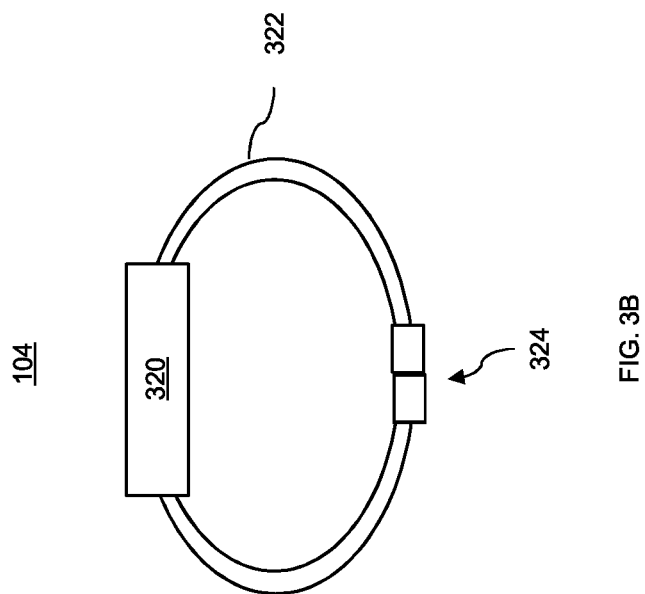

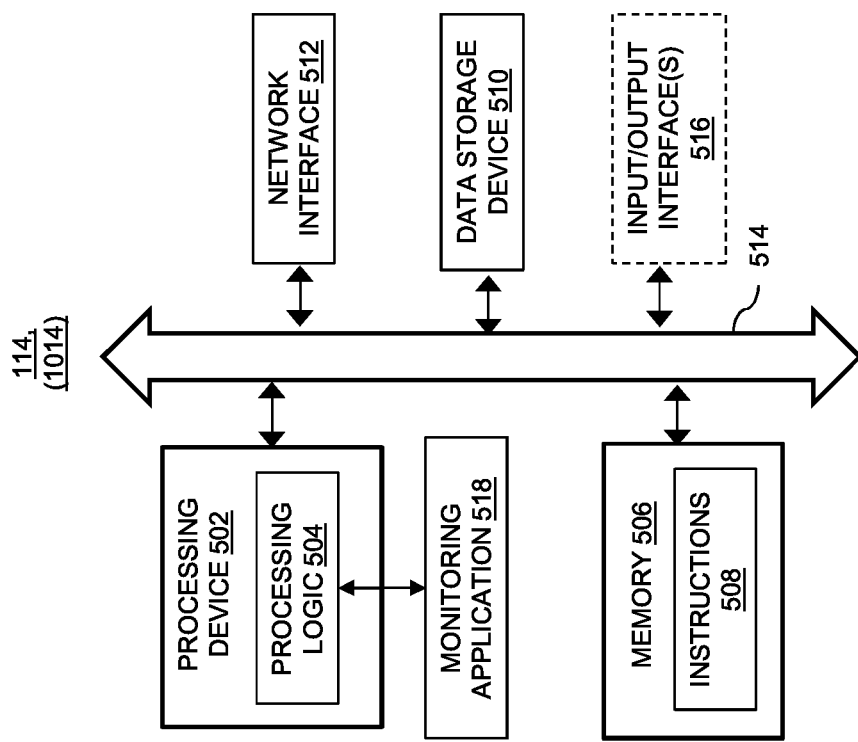
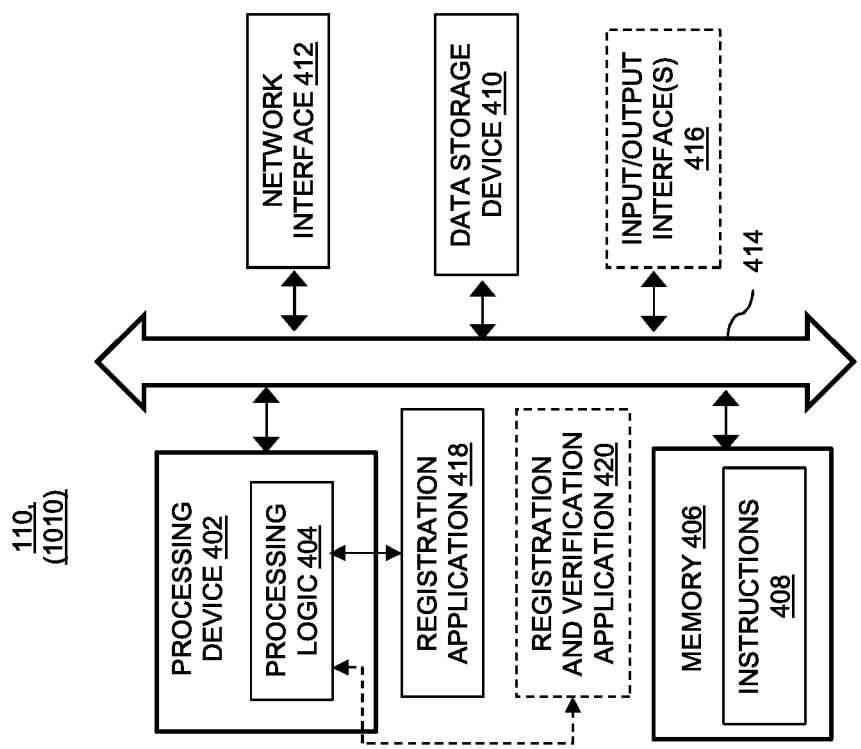

SECURITY SYSTEMS AND METHODS FOR CONTINUOUS AUTHORIZED ACCESS TO RESTRICTED ACCESS LOCATIONS

CROSS-REFERENCE TO RELATED APPLICATIONS

The present application claims priority to U.S. Provisional Application Ser. No. 62/256,420, entitled "IDENTITY MANAGEMENT AND SECURITY SYSTEM," filed Nov. 17, 2015, which is incorporated fully herein by reference.

TECHNICAL FIELD

The present disclosure relates generally to digital security systems and, in particular, systems and methods for authorized access to one or more restricted access locations, identity management and restricted access monitoring using first and second electronic devices.

BACKGROUND

More electronic devices are connecting online to a variety of services, websites, applications, etc. Current secure access solutions (e.g., user identity (ID), password) based on, for example, keyboard input and/or universal serial bus (USB) sticks may not be practical. For example, not all devices need or have a keyboard or a USB port. Nevertheless, all types of devices may need protection. Consumers and employees may dislike passwords and may tend to forget them. Furthermore, these same passwords, no matter how complex, may be repeatedly exploited by attackers to gain access to restricted information and devices. The Industrial Internet/Industry 4.0 (i.e., the integration of physical machinery with networked sensors and software) may also need protection. A new solution is needed that solves for secure access across all devices (industrial and consumer).

SUMMARY

Aspects of the present disclosure relate to security systems and methods for authorized access to one or more restricted access locations. A security system includes a first electronic device, a second electronic device and a secure storage on at least one of the first electronic device and the second electronic device. The first electronic device includes a non-transitory memory storing computer-readable instructions and a processor. The second electronic device is associated with a unique device identifier. Each of the first electronic device and the second electronic device includes a wireless communication interface for wireless communication therebetween. The secure storage is configured to store one or more security credentials associated with a user for authorized access to one or more restricted access locations. Execution of the computer-readable instructions by the processor of the first electronic device causes the processor to: detect a presence of the second electronic device within a predetermined proximity range of the first electronic device, based on an indication received from the second electronic device via the respective wireless communication interface; establish a communication channel between the first electronic device and the second electronic device via each wireless communication interface, responsive to the detected presence of the second electronic device; receive the unique device identifier from the second electronic device via the communication channel; determine whether the received unique device identifier matches a predetermined identifier stored in the secure storage, to validate the second electronic device; determine whether the first electronic device and the second electronic device maintain a predefined connection state; and permit access to the one or more security credentials stored on the secure storage when the second electronic device is validated and the predefined connection state is maintained.

Aspects of the present disclosure also relate to security systems and methods for authorized access to one or more restricted access locations. A security system includes a first electronic device, a second electronic device and a secure storage on at least one of the first electronic device and the second electronic device. The first electronic device includes a non-transitory memory storing computer-readable instructions, a processor and a user interface. The second electronic device is associated with a unique device identifier. Each of the first electronic device and the second electronic device includes a wireless communication interface for wireless communication therebetween. The secure storage is configured to store one or more security credentials associated with a user for authorized access to one or more restricted access locations. Execution of the computer-readable instructions by the processor of the first electronic device causes the processor to: detect a presence of the second electronic device within a predetermined proximity range of the first electronic device, based on an indication received from the second electronic device via the respective wireless communication interface; establish a communication channel between the first electronic device and the second electronic device via each wireless communication interface, responsive to the detected presence of the second electronic device; receive the unique device identifier from the second electronic device via the communication channel; determine whether the received unique device identifier matches a predetermined identifier stored in the secure storage, to validate the second electronic device; receive user identity information from the user via the user interface; determine whether the user identity information matches predetermined user identity information, to validate an identity of the user; determine whether the first electronic device and the second electronic device maintain a predefined connection state; and permit access to the one or more security credentials stored on the secure storage when the identity of the user is validated, the second electronic device is validated and the predefined connection state is maintained.

BRIEF DESCRIPTION OF DRAWINGS

FIG. 3B is a side view diagram of an example wearable electronic device which may be representative of the second electronic device shown in FIG. 3A, according to an aspect of the present disclosure.

FIG. 4 is a functional block diagram of an example registration server, according to an aspect of the present disclosure.

FIG. 5 is a functional block diagram of an example monitoring server, according to an aspect of the present disclosure.

DETAILED DESCRIPTION

Figure 1:
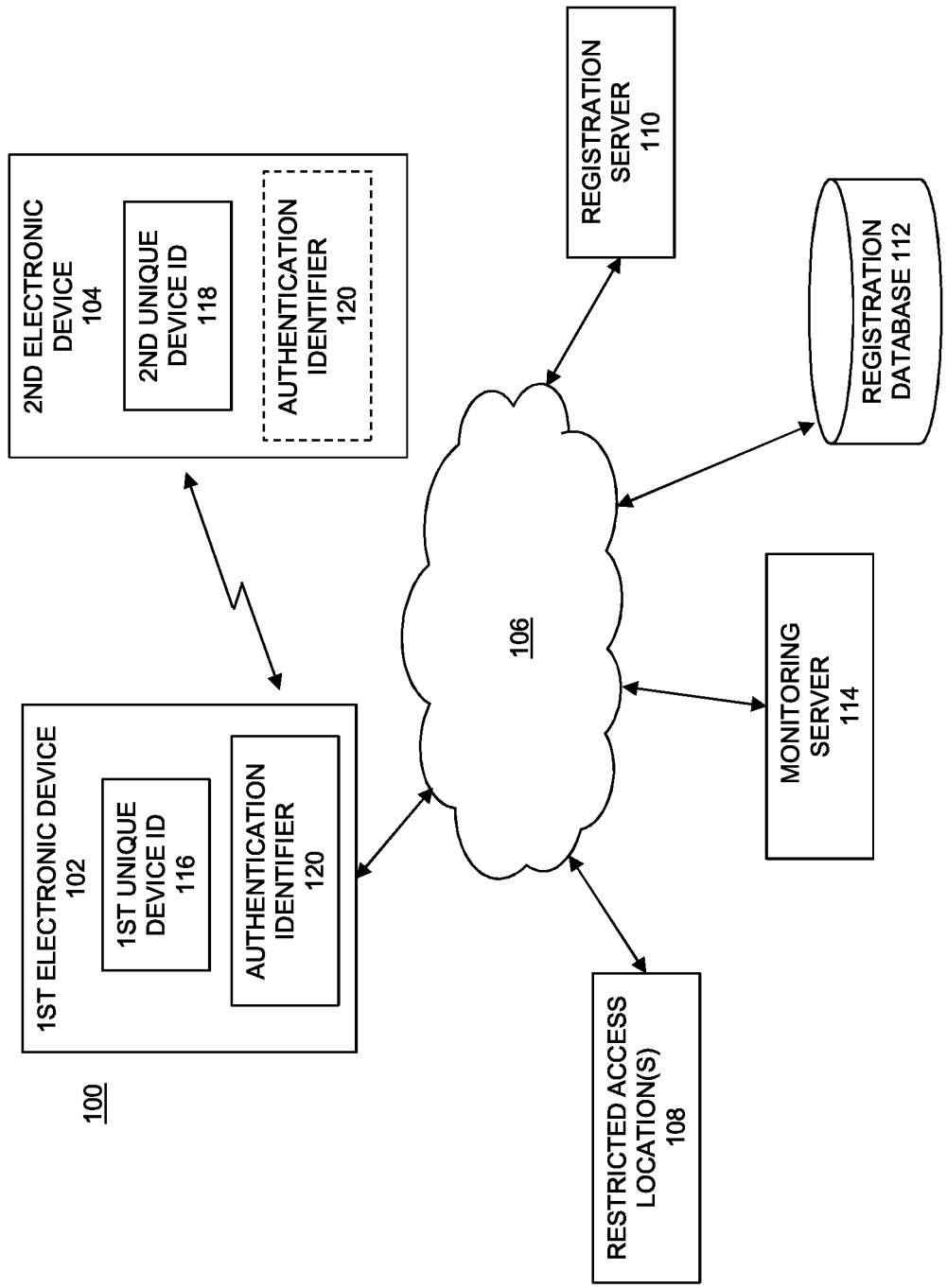
FIG. 1 is a functional block diagram of an example security system, according to an aspect of the present disclosure.

Users typically have a real identity, such as a national ID card or a driver's license, which can be confirmed by way of one or more verification providers. Users may also have one or more virtual identities, for accessing resources such as websites, applications, information, locations, etc. However, for virtual identities, each resource (such as a website) may include a sign-up process that creates a separate identity each time a user registers. This may create unnecessary overhead and may be a deterrent for online commerce. Furthermore, with each cyber compromise, large volumes of identity information is being extracted and misused to target specific users. A solution that is able to combine a user's real-world identity with the virtual world identity while maintaining privacy is needed, but is currently unavailable.

Currently, many password storage solutions architectures include central storage of user specific master passwords that can be accessed by the solution provider. These providers may protect the users by creating stringent policies and may use external auditors to police the enforcement of these policies. However, if necessary, someone other than the user can access user specific passwords without the user's knowledge. A solution where the architecture only allows the user to access the password without any backdoor or master password access is needed but not available.

Users often use different operating platforms from different manufacturers. A common approach to access security credentials across all of these devices is to use a central storage mechanism for all security credentials and synchronize the mechanism with all of the devices. Once a password is entered to access this central mechanism, all of the security credentials may be accessible. While this may be convenient for the user, it creates significant risk. Not only are all the security credentials stored in one location, addresses of restricted access locations (ARALs) may also be available within the same mechanism. If compromised, an attacker may obtain a list of all the user's security credentials and ARALs. A solution that only maintains a local copy of the security credentials, while keeping a separate central repository of all the ARALs is needed, but currently not available.

Many current authentication systems assume that once correct credentials (e.g., a user ID, a password, security question response(s), and/or a request coming from a registered device) are provided, unrestricted access may be granted and no further monitoring needs to be performed. A fundamental weakness in this approach is that, after access has been granted, the identity of the user becomes unknown. Without re-confirming the user's identity, it may be difficult to determine whether the same user continues to access the system or whether another impersonator has taken over access. An authentication solution that continuously re-confirms the identity of the user is needed, but is currently unavailable.

Existing two-factor or two-step authentication systems that use two separate hardware devices may be more challenging to compromise. However, some implementations of this type of authentication may be inconvenient for the user. For example, the user may carry a separate device (i.e., a USB key). The user may receive a separate code on the separate device and then enter this code manually to obtain access. A multi-factor (i.e., more than two-factor/two-step) authentication solution that does not require the user to perform manual tasks to repeatedly confirm their identity is needed, but is currently not available.

Keylogging is the most typically used approach taken by hackers to steal credentials. If this vulnerability is exploited, any user that stores credentials centrally and accesses them via a password or types passwords manually may become vulnerable to such attacks. Even two-step or two-factor authentication systems require typing a password, and therefore also makes them vulnerable to keylogging. A solution that does not require the user to use a physical keyboard to type in a password or other credentials is needed, but currently unavailable.

Intrusion detection systems (IDS) often analyze the "mass" movement of data and involves significant forensic analysis to determine whether the data movement is a result of a cyber-attack or is typical user behavior. Currently, this process may take a long period of time (often days or weeks) and may involve a manual process. This may be disadvantageous. For example, the longer it takes to make a determination of a cyber-attack, the higher the likelihood of significant and ongoing data loss. A solution where the true identity of a user may be determined in real-time so that a security team can instantaneously identify compromised user accounts is needed, but unavailable.

Many authentication solutions that leverage handheld devices are often limited to devices that have an operating system from the same manufacturer. For example, Apple's iCloud Keychain® may operate on iOS or Mac OS X devices. A user may not be able to use iCloud Keychain® on a Windows device or an Android device. These types of proprietary solutions may create a significant burden on the user as they remove the flexibility for the user to use any device, anywhere, anytime. A solution that allows the user to access their authentication credentials on any system, anywhere, anytime, is needed, but currently not available.

Audit logs for access to systems or data are often maintained at an identity access management (IAM) system (e.g., Microsoft Active Directory), an application system (e.g., Oracle Financials) or a service provider system (e.g., SalesForce) level. While this may be important for the administration of access and maintenance of each system separately, this approach fundamentally ignores the importance of real-time user centric analysis for determining whether the credentials of a user have been compromised. A solution where audit logs are monitored such that they may provide a universal view of user activity is needed, but is currently unavailable.

Many existing IAM solutions are organization specific and not user specific. As users interact with more organizations, employers, banks, public transportation, home-office, car companies, etc., managing multiple IAM systems has become more challenging. A user centric IAM solution is needed but is currently not available. An IAM solution that is user focused so that a user can securely access multiple organizations that are unrelated to one another is needed, but is not available.

Leveraging biometrics may be convenient for security purposes, because biometric information (e.g., a fingerprint, a retina signature, a heartbeat signature, etc.) may always physically be with the user. On the other hand, once these are stolen, they cannot be replaced with a new fingerprint, new retina signature or a new heartbeat signature. A solution where biometrics are leveraged for convenience (and locally stored to prevent against a massive breach of all user biometric data) but may not be a foundational element of security is needed, but is not available.

Existing authentication solutions are a) secure but not easy for user operation or b) easy for user operation but not secure. A better approach is needed that is transparent to the user but may provide: two or more factor authentication, decentralized storage of credentials for users, the capability to differentiate between real users and impersonators, an IAM solution that is use-centric (as opposed to being organization-centric), ease in registering for restricted access locations (RALs) (such as new websites) while protecting the user's privacy, and the ability to access RALs anywhere and anytime without having to memorize passwords.

Generally described, aspects of the present disclosure relate to systems and methods for providing authorized access to one or more restricted access locations. The system may include a first electronic device and a second electronic device. The first electronic device may be associated with a first unique device identifier. The first electronic device (and/or the second electronic device) may include a secure storage configured to securely store one or more security credentials associated with the user for the authorized access to the respective restricted access locations. In some examples, the second electronic device may include a wearable device that is a physically separate device from the first electronic device, and may be associated with a second unique device identifier different from the first unique identifier. Description of embodiments is exemplary and not intended to limit the claims.

The first electronic device may detect that the second electronic device is within a predetermined proximity range to the first electronic device, based on an electronic signal wirelessly received from the second device. Responsive to the detection, the first and second devices may be paired together, to form a bonded state, and establish a communication channel therebetween. For example, the first and second devices may be paired and bonded according to a Bluetooth pairing and bonding protocol. In some examples, the communication channel may include a secure communication channel, based on encryption/decryption keys known by the first and second electronic devices. After the first and second electronic devices establish the communication channel, the first electronic device may validate the second electronic device, by determining whether the second unique device identifier matches a predetermined identifier stored in the secure storage. The first electronic device may also determine whether the first electronic device and the second electronic device maintain a predefined connection state. When the second electronic device is valid and the predefined connection state is maintained, the first and second devices may form a connected state.

In some examples, the first electronic device may receive authentication information from the user via a user interface and determine whether the authentication information for the user is valid. The authentication information may be used to indicate whether the user is authorized to use the first electronic device and the second electronic device. When the authenticated information is valid (and the devices have achieved the connected state), the first and second devices may form an authenticated state.

When the first and the second electronic devices are in the authenticated state, the first electronic device may permit access to the security credentials in the secure storage. Thus, access may be permitted when the second electronic device is validated, the predefined connection state is maintained and the user is authenticated. In operation, when the first electronic device detects a request to access a restricted access location (RAL), the security credentials for the RAL are known to be stored in the secure storage, and the devices are in the authenticated state, the first electronic device may be permitted to obtain and apply the credentials to the RAL. In some examples, the first electronic device may apply the credentials to the RAL without user input. In some examples, the first electronic device may apply the credentials to the RAL with some user input, such as by selecting an icon on a display screen. When the first and second electronic devices are not in the authenticated state, access to the credentials may not be permitted. Thus, when the two devices have achieved an authenticated state, security credentials locally stored on the first electronic device (and/or second electronic device) may be retrieved and used for access to RALs, without user input of a user ID/password and, in some examples, without using any biometric information of the user.

In some examples, a wearable second electronic device may determine whether the wearable device is coupled and/or secured to the user, and transmit an indication to the first electronic device. When the wearable device is secured (coupled) to the user, the system may enter a secured state. In some examples, the wearable device may detect coupling of the device to the user. In some examples, the wearable device may detect engagement of the wearable device (e.g., closure of a clasp). In some examples, the connection and authentication modes are established responsive to receipt of the indication by the first electronic device. In some examples, access to the stored credentials in the first (and/or second) electronic device may be permitted only when both the first and second electronic devices are in the secured state and in the authenticated state.

In some examples, when the first and second electronic devices are in the connected state, and prior to the request for access, the first electronic device may request user identification information from the user, via a user interface (as opposed to authentication information). The user interface may include, without being limited to, a physical keyboard, a virtual keyboard, a camera, a microphone and/or a biometric input device. The first electronic device may compare received user identity information to predetermined user information to verify an identity of the user. When the user's information is verified, the system may enter an identified state. The access to the security credentials on the secure storage may be permitted when the first and second electronic devices are both in the connected state and in the identified state. The identity information may be verified directly on the first electronic device and/or on one or more servers coupled to the first electronic device.

In some examples, the user identification information may include an established physical identity mechanism (EPIM). The EPIM may include, without being limited to, a government issued identity, a debit/credit card, an identity card, an account number, an employee email address, an employee ID, a customer ID, a supplier ID, etc. During registration of the first and second electronic devices, the user may be requested to provide an EPIM, for example, via input using the first electronic device. A server coupled to the first electronic device may verify the EPIM (such as via a Government organization, a financial institution, a telecommunication operator, an employer, a 3rd party verification service, etc.).

In some examples, after the system is provided with authorized access to the restricted access location, a server may periodically capture data associated with device usage. The captured data may indicate whether a particular identified user, using a specific device, using a specific session (e.g., specific browser/browser session, application/application session) accessed a specific resource. The information may be used to identify whether an authorized user or an imposter has taken over the resource.

The restricted access locations may include physical or virtual locations, where access may only be granted via authentication information (e.g., a physical key, a user ID/password, a code). The restricted access locations may include websites, mobile applications, home/office appliances, home/office electronics, home/office physical access points, etc.

The first electronic device may include any electronic device capable of electronic communication via a communication network and capable of wireless communication with the second electronic device. For example, the first electronic device may include a mobile phone (including a smartphone), a computer (including a notepad computer, a laptop computer, a personal computer), a tablet, a smart watch, a multimedia device (e.g., a car infotainment system, a home multimedia system such as Amazon Echo®), a home automation system, an automated teller machine (ATM), a credit card/debit card payment reader, etc. The second electronic device may include any device capable of wireless communication with the first electronic device. In some examples, the second electronic device may include a wearable device (e.g., a smart watch, a fitness tracker, a health tracker, a specialized wearable device, etc.) The first and second electronic devices may include two physically separate electronic devices where their individual hardware identifiers are unique and cannot be changed. Each device may store data securely, exchange data securely and communicate securely with other electronic devices.

FIG. 1 is a functional block diagram of example security system 100, according to aspects of the present disclosure. System 100 may include first electronic device 102 and second electronic device 104. First device 102 may be a physically separate device from second device 104. First and second devices 102, 104 may be configured to wirelessly communicate with each other via any suitable wireless communication protocol (e.g., such as via Bluetooth, near-field communication (NFC), etc.). First device 102 may be configured to store first unique device identifier (ID) 116 associated with first device 102 and authentication identifier (ID) 120. Second device 104 may be configured to store second unique device identifier 118 associated with second device 104. In some examples, second device 104 may be configured to store authentication identifier 120, instead of first device 102. In some examples, both first device 102 and second device 104 may be configured to store authentication identifier. First device 102 is described further below with respect to FIG. 2. Second device 104 is described further below with respect to FIGS. 3A and 3B. Although the examples below illustrate Bluetooth and NFC communication protocols, it may be appreciated that the systems and methods of the current disclosure are not limited to these example protocols. Other non-limiting examples of wireless communication protocols include radio frequency identification (RFID), WiFi, Worldwide Interoperability for Microwave Access (WiMAX), ZigBee, frequency division multiple access (FDMA), time division multiple access (TDMA), code division multiple access (CDMA), and long-term evolution (LTE).

First device 102 (and/or second device 104) may be configured to communicate with one or more restricted access locations (RALs) 108 via communication network 106. First device 102 may also be configured to communicate with registration server 110 during a registration process (described further below with respect to FIG. 9). Registration server 110 may also transfer information from second device 104 via first device 102 (or directly to second device 104). Registration information may be stored in registration database 112. Registration information may include, for example, first unique identifier 116 associated with first device 102, second unique identifier 118 associated with second device 104 and any restricted access locations for authorized access by first device 102. In some examples, the registration information may also include authentication ID 120. In some examples, registration server 110 may also store user information, such as, without being limited to, user device details (e.g., device name, device model, media access control (MAC) information, an internet protocol (IP) address, an operating system, etc.), any logs of user activity, user credentials back up data, user device certificate(s) (e.g., a public key), and user authentication and/or user identification backup data.

System 100 may also include monitoring server 114 for periodically monitoring session information and device information during access to various resources by first device 102 (during an authenticated state) (or one or more further electronic devices (not shown) such as a personal computer), described further below with respect to FIG. 8. The monitored information may be used, for example, to monitor use of first electronic device 102, monitor use of second electronic device 104, monitor use of a further electronic device, monitor use of any RALs accessed using security credentials 224 from secure internal storage (e.g., storage 204 and/or storage 304) and/or to identify whether an authorized user or a fraudulent user (i.e., an imposter) is accessing a resource.

Collectively, system 100 may provide a continuous multifactor authentication (MFA) for access to RALs 108. The continuous MFA may use multiple factors to authenticate a user and provide user access to RALs 108 (e.g., described further below with respect to FIGS. 6A-6C and FIG. 7), using first and second devices 102, 104. In addition, the continuous MFA repeatedly audits the provided access and this information (generated by the continuous MFA) may be used to prevent access to unauthorized users (described further below with respect to FIG. 8).

Although not shown in FIG. 1, in some examples, registration server 110 and/or monitoring server 114 may be configured to directly communicate with each of first electronic device 102 and second electronic device 104. Registration server 110 and monitoring server 114 are described further below with respect to FIGS. 4 and 5. Although registration server 110 and monitoring server 114 are shown as separate servers, in some examples, the functions of servers 110 and 114 may be included in a single server.

As discussed above, RAL(s) 108 may include physical or virtual locations, where access may only be granted via authentication information (e.g., a physical key, a user ID/password, a code, a cryptographic key). RAL(s) 108 may include, without being limited to, websites, mobile applications, home/office appliances, home/office/other electronics, vehicles, home/office/other physical access points (e.g., building door(s), etc.), multimedia devices (e.g., vehicle infotainment systems, home multimedia systems, home automation systems, ATMs and credit card/debit card payment readers.

Figure 2:
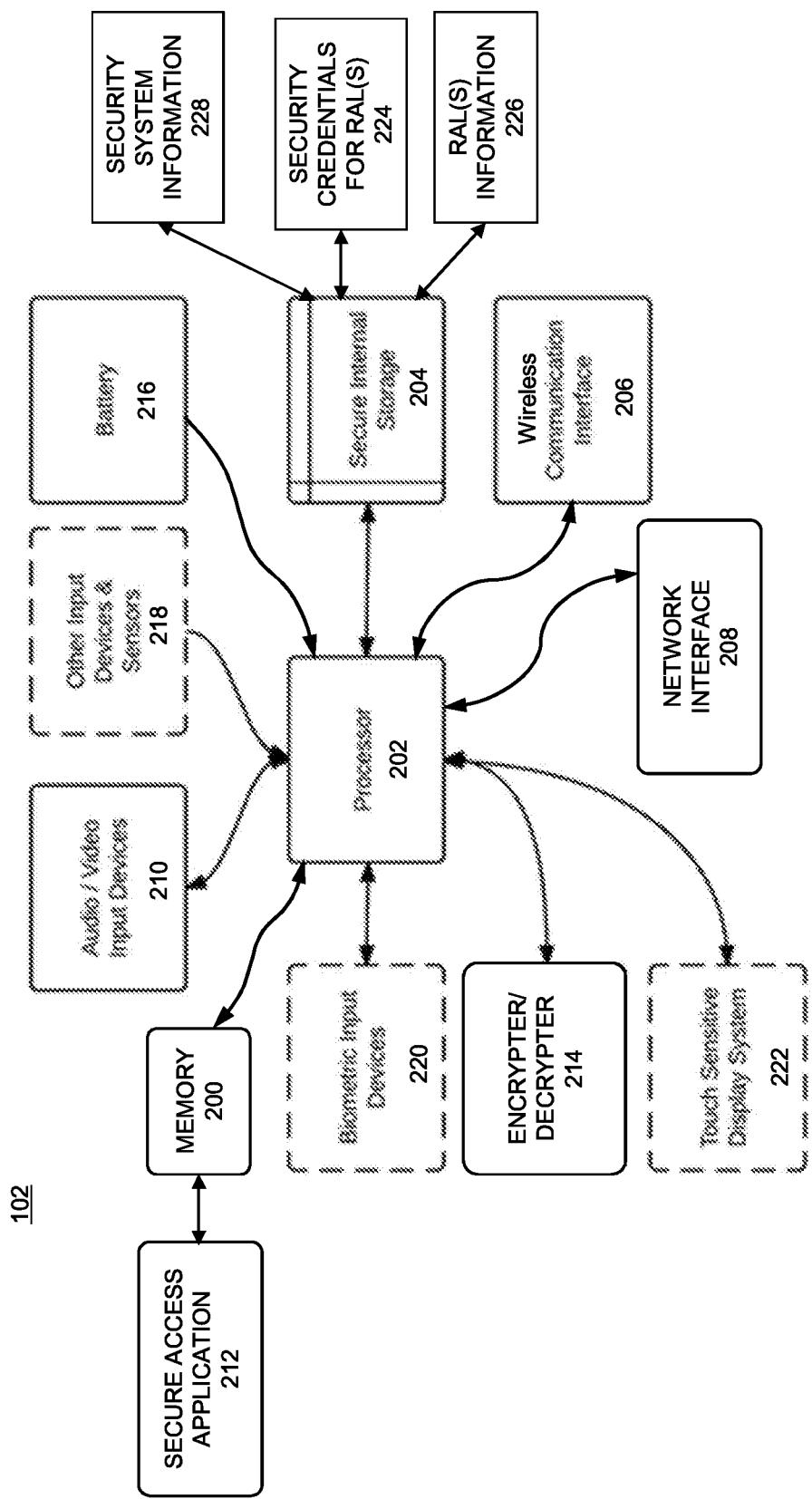
FIG. 2 is a functional block diagram of an example first electronic device of the system shown in FIG. 1, according to an aspect of the present disclosure.

FIG. 2 is a functional block diagram illustrating an example first device 102 according to aspects of the present disclosure. Illustratively, first device 102 may include non-transitory memory 200, processor 202, secure internal storage 204 (also referred to herein as secure storage 204 or storage 204), wireless communication interface 206, network interface 208, one or more audio/video input devices 210, encrypter/decrypter 214, battery 216 for powering first device 102, optional other input devices and sensors 218, optional biometric input device(s) 220 and optional touch sensitive display system 222. Secure internal storage 204 may be configured to store security credentials 224, RAL(s) information 226 and security system information 228. Secure access application 212 may be stored in memory 200 and may contain computer-implementable code for performing the operations described herein. Security credentials 224 may be accessed in secure internal storage 204 only when first device 102 and second device 104 are in an authenticated state (described further below). Components of first device 102 may communicate with each other via a communication and data bus (not shown). In general, input devices 210, other optional devices 218, optional biometric input devices 220 and optional display system 222 may be referred to herein as a user interface.

Processor 202 may be configured to control one or more components of first device 102 (i.e., non-transitory memory 200, secure internal storage 204, wireless communication interface 206, network interface 208, audio/video input device(s) 210, encrypter/decrypter 214, battery 216, optional other input devices and sensors 218, optional biometric input device(s) 220 and optional touch sensitive display system 222). Processor 202 may include, without being limited to, a microprocessor, a central processing unit, an application specific integrated circuit (ASIC), a field programmable gate array (FPGA) and/or a digital signal processor (DSP). Processor 202 may be configured to execute processing logic for performing the operations described herein. In general, processor 202 may include any suitable special-purpose processing device or a general-purpose processing device specially programmed with processing logic to perform the operations described herein. In some examples, processor 202 may be configured to execute secure access application 212 to perform the operations described herein.

Memory 200 may include, for example, without being limited to, at least one of a read-only memory (ROM), a random access memory (RAM), a flash memory, a dynamic RAM (DRAM) and a static RAM (SRAM), storing computer-readable instructions (i.e., programming logic such as secure access application 212) executable by processor 202. In general, memory 200 may include any suitable non-transitory computer readable storage medium storing computer-readable instructions executable by processor 202 for performing the operations described herein. Although one memory 200 is illustrated in FIG. 2, in some examples, first device 102 may include two or more memory devices (e.g., dynamic memory and static memory).

In some examples, memory 200 may include a data storage device storing instructions (e.g., software) for performing any one or more of the functions described herein (including the predetermined operation modes as described herein). The data storage device may include any suitable non-transitory computer-readable storage medium, including, without being limited to, solid-state memories, optical media and magnetic media.

Security credentials 224 may represent security credentials associated with one or more RALs 108. Examples of security credentials 224 may include, without being limited to, one or more of a user ID, a password (including a one-time password (OTP)), a predetermined code, an access key, a cryptographic key and a security question response. RAL(s) information 226 may represent any information associated with each RAL 108 for which first device 102 (and/or second device 104) stores security credentials 228. For example, RAL(s) information 226 may include list of one or more RALs 108 corresponding to security credentials 224 (and/or 328). In some examples, such as for virtual locations, RAL information 226 may include a virtual address of RAL 108 (e.g., for access to RAL 108 over network 106. Security system information 228 may represent any information associated with establishing an authorized state (or identified state as in system 1000 of FIG. 10). Example security system information 228 may include, without being limited to, first unique device ID 116, authentication ID 120 (or user identity indication 1022 in FIG. 10), second unique device ID 118, validation code(s) (described further below), encryption/decryption keys for creating a secure communication channel between first and second devices 102, 104. In some examples, security credentials 224, RAL(s) information 226 and security system information 228 may be stored in separate databases in secure storage 204. In some examples, one or more of security credentials 224, RAL(s) information 226 and security system information 228 may be combined into one database in secure storage 204.

In some examples, secure storage 204 may include built-in internal storage (such as hardware and/or software-based secure storage space) that is part of first device 102 and/or registration-generated storage (e.g., hardware and/or software-based secure storage space). In some examples, built-in internal storage may be configurable according to device manufacturer and/or owner specifications. In some examples, one or more components of system 100 (such as registration server 110) may control configuration of registration-generated storage. In general, the storage configuration may include storage access and/or storage allocation.

Wireless communication interface 206 may be configured to wirelessly communicate with second device 104 (connected) via a wireless communication channel. Wireless communication interface 206 may be configured to wirelessly communicate with second device 104 via any suitable short-range wireless communication standard, such as, without being limited to, Bluetooth and NFC standards. Wireless communication interface 206 may be controlled by processor 202 to interact with second device 104 such that information is passed between first device 102 and second device 104 (i.e., over a short-range or long-range wireless communication channel).

Network interface 208 may be configured to communicate with restricted access location(s) 108 and registration server 110 over communication network 106. Communication network 106 may include one or more private and/or public networks.

First device 102 may include any compatible electronic device that can communicate wirelessly and interact with second device 104. Examples of first device 102 may include, without being limited to, mobile phones, tablet computers and personal computers (e.g., desktop computers or laptop computers). In some examples, first device 102 may include a wearable device, such as, without being limited to, a smart watch, a fitness tracker, a health tracker, jewelry (e.g., a necklace, an earring, etc.) and a specialized wearable device.

Although not shown, first device 102 may be configured to communicate with a further electronic device (e.g., a tablet computer or personal computer) via wired communication, wireless communication (e.g., via wireless communication interface 206) and/or via network 106 (e.g., via network interface 208). The user may use the further electronic device to provide various user input to first device 102, for example, for registration of first and second devices 102, 104, for authentication ID 120 (or user identity information with respect to FIG. 10), for security credentials 224, for RAL(s) information 226 and/or for accessing RAL(s) 108. In some examples, first device 102 may obtain security credentials from a further electronic device and/or may input security credentials into the further electronic device, when first and second devices 102, 104 are in the authenticated state (or when first and second devices 1002, 1004 are in the identified state described below with respect to FIGS. 12A and 12B).

In some examples, first device 102 may include audio/video input device(s) 210 for receiving one or more user inputs from a user of first device 102. Device(s) 210 may include, for example, one or more buttons, an alphanumeric input device, a cursor control device, a microphone, a camera and/or a display. The user input may, for example, be used to select restricted access locations, to input authentication identifier 120, and to register first device 102 and second device 104. First device 102 may also include any other suitable input devices and/or sensors 218 for accepting/capturing user input (e.g., motion, user position, etc.) Although not shown, first device 102 may also include any suitable user output device, such as a display, a loudspeaker, a vibration sensor, etc.

In some examples, first device 102 may include optional touch sensitive display system 222. Optional touch sensitive display system 222 may, for example, be used to indicate prompts for user input and/or various information during one or more predetermined operation modes. In some examples, optional touch sensitive display system 222 may provide a virtual keyboard for user input. In general, first device 102 may include any suitable user interface for capturing user input and providing information to the user for operation of system 100 including secure access to RAL(s) 108.

Optional biometric input device(s) 220 may include any suitable input device for capturing biometric data of a user. Example, biometric data may include, without being limited to a fingerprint, a retina signature (i.e., eye scan data), a heartbeat signature and a voiceprint. In some examples, optional biometric device(s) 220 may be used with system 100 (FIG. 10) for verifying an identity of the user.

Encrypter/decrypter 214 may be configured to encrypt and decrypt data sent between first device 102 and second device 104 according to encryption/decryption keys stored in secure internal storage 204 (i.e., as part of security system information 228). Encrypter/decrypter 214 may also be configured to encrypt and decrypt information sent to registration server 110 and/or monitoring server 114 via network 106. In some examples, encrypter/decrypter 214 may include a cryptographic engine for carrying out cryptographic operations such as encryption, decryption, public and/or private key generation, pseudo-random number generation, digital signatures, etc. The cryptographic engine may include software, hardware and/or a combination thereof for performing cryptographic operations using one or more cryptographic algorithms. In some examples, the cryptographic engine may include a hardware device (e.g., a dedicated computer on a chip or a microprocessor) for carrying out cryptographic operations. In some examples, the cryptographic engine may include a separate device (e.g., a co-processor) in electronic communication with processor 202. In some examples, the cryptographic engine may be integrated into processor 202 itself.

First device 102 may include any suitable hardware and/or software components for performing the functions described herein.

Figure 3A:
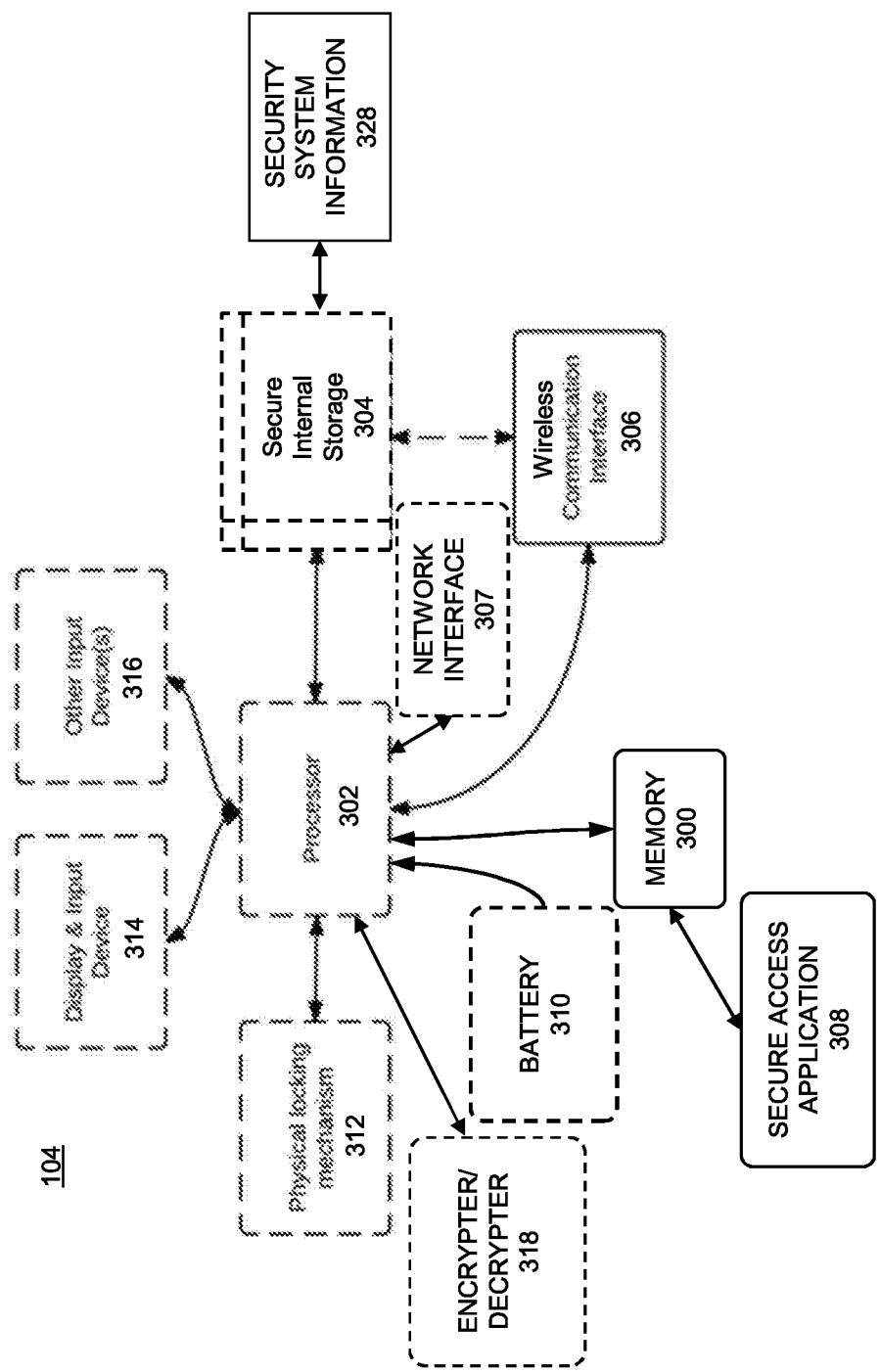
FIG. 3A is a functional block diagram of an example second electronic device of the system shown in FIG. 1, according to an aspect of the present disclosure.

FIG. 3A is a is a functional block diagram illustrating an example second device 104 according to aspects of the present disclosure. Illustratively, second device 104 may include non-transitory memory 300, processor 302, optional secure internal storage 304 (also referred to herein as secure storage 304 or storage 304), wireless communication interface 306, optional network interface 307, optional battery 310 for powering second device 104, optional physical locking mechanism 312, optional display/input device(s) 314, optional other input device(s) 316 and optional encrypter/decrypter 318. In some examples, second device 104 may include encrypter/decrypter 318. In other examples, second device 104 may not include encrypter/decrypter 318. In some examples, second device 104 may include secure internal storage 304. In other examples, second device 104 may not include secure internal storage 304. In examples of second device 104 that do not include secure internal storage 304, information described as being stored in storage 304 may be stored in memory 300. Components of second device 104 may communicate with each other via a communication and data bus (not shown).

Secure internal storage 304 may be configured to store, for example, security information 328. Security information may include, without being limited to, second unique device identifier 118, validation code(s), any secure access keys (described further with respect to FIG. 6C) and encryption/decryption keys for a secure communication channel between first and second devices 102, 104. Although not shown, in some examples, secure internal storage 304 may also store security credentials 224 and/or RAL(s) information 226 for one or more RALs 108. Accordingly, in some examples, access to security credentials 224 may include access to security credentials 224 stored on first device 102 and/or second device 104. Secure access application 308 may be stored in memory 300 and may contain computer-implementable code for performing the operations described herein.

In some examples, secure storage 304 may include hardware-based storage space (e.g., an embedded secure element storage location) and/or software-based secure storage. In some examples, secure storage 304 may include built-in internal storage that is part of second device 104 and/or registration-generated storage. In some examples, one or more components of system 100 (such as registration server 110) may control configuration of storage 304. In some examples, storage 304 may include built-in storage that may or may not be configurable by component(s) of system 100. For example, secure storage 304 may include built-in storage that may not be accessible component(s) of system 100.

In some examples, encrypter/decrypter 318, similar to encrypter/decrypter 214, may include a cryptographic engine for carrying out cryptographic operations such as encryption, decryption, public and/or private key generation, pseudo-random number generation, digital certificates, etc. In some examples, the cryptographic engine may include a separate device (e.g., a co-processor) in electronic communication with processor 302. In some examples, the cryptographic engine may be integrated into processor 302 itself.

In general, display/input device(s) 314 and other optional input device(s) 316 may be referred to herein as a user interface. Display/input device(s) 314 and optional input device(s) 316 may represent any suitable device for capturing user input (e.g., a microphone, a camera, button(s), an accelerometer, an alphanumeric input device, a cursor control device, a touch-sensitive display, etc.) and/or one or more output devices (e.g., a display, a loudspeaker, a vibration sensor, etc.). In some examples, second device 102 may include optional network interface 307, for direct communication with, for example, registration server 110 and/or monitoring server 114. In some examples, second device 102 may communicate directly with restricted access location(s) 108 via optional network interface 307. Memory 300, processor 302, secure internal storage 304, wireless communication interface 306, optional network interface 307, and encrypter/decrypter 318 are similar to memory 200, processor 202, secure internal storage 204, wireless communication interface 206, network interface 208, and encrypter/decrypter 214 described above with respect to FIG. 2.

In some examples, second device 104 may include any compatible portable electronic device that can communicate wirelessly and interact with first device 102. Examples of second device 104 may include, without being limited to, mobile phones, tablet computers and laptop computers.

In some examples, second device 104 may include a wearable device that is capable of being coupled to the user (i.e., worn by the user). For example, the wearable device may include a smart watch, a fitness tracker, a health tracker, a specialized wearable device configured as jewelry, etc. In some examples, a wearable second device 104 may include optional physical locking mechanism 312. Mechanism 312 may be configured to detect whether second device 104 is coupled to and/or secured to the user. For example, mechanism 312 may detect skin coupling of second device 104 to the user. In some examples, mechanism 312 may detect other biometric data (e.g., a heartbeat, a pulse, respiration, etc.) to determine whether second device 104 is coupled to and/or secured to the user. As another example, mechanism 312 may detect closure or opening of a physical locking device, such as a clasp. In some examples, processor 302 may be configured to send a secured and/or unsecured indication to first device 102 based on coupling/non-coupling detection by optional mechanism 312.

Second device 104 may include any suitable hardware and/or software components for performing the functions described herein.

Referring to FIG. 3B, an example of a wearable second device 104 is shown. In some examples, second device 104 may include housing 320 for holding hardware and/or software components of second device 104 (such as shown in FIG. 3A). Second device 104 may also include strap 322 for fixing second device 104 to a user and clasp 324 for securing second device 104 to the user. In some examples, clasp 324 may include physical locking mechanism 312 for detecting whether clasp 324 is secured.

FIG. 4 illustrates a functional block diagram of an example registration server 110 (or registration and verification server 1010 shown in FIG. 10) in the example form of a computer system within which a set of instructions for causing the machine to perform any one or more of the methodologies discussed herein, may be executed. In some examples, the machine may be connected (e.g., networked) to other machines. The machine may be any machine capable of executing a set of instructions (sequential or otherwise) that specify actions to be taken by that machine for performing the functions describe herein. Further, while only a single machine is illustrated, the term "machine" shall also be taken to include any collection of machines that individually or jointly execute a set (or multiple sets) of instructions to perform any one or more of the methodologies discussed herein.

Example registration server 110 may include processing device 402, memory 406, data storage device 410 and network interface 412, which may communicate with each other via data and control bus 414. In some examples, registration server 110 may also include input/output interface(s) 416.

Processing device 402 may include, without being limited to, a microprocessor, a central processing unit, an application specific integrated circuit (ASIC), a field programmable gate array (FPGA), a digital signal processor (DSP) and/or a network processor. Processing device 402 may be configured to execute processing logic 404 (including registration application 418 or registration and verification application 420) for performing the operations described herein. In general, processing device 402 may include any suitable special-purpose processing device or a processing device specially programmed with processing logic 404 to perform the operations described herein.

Memory 406 may include, for example, without being limited to, at least one of a read-only memory (ROM), a random access memory (RAM), a flash memory, a dynamic RAM (DRAM) and a static RAM (SRAM), storing computer-readable instructions 408 executable by processing device 402. In general, memory 406 may include any suitable non-transitory computer readable storage medium storing computer-readable instructions 408 executable by processing device 402 for performing the operations described herein. Although one memory device 408 is illustrated in FIG. 4, in some examples, registration server 110 may include two or more memory devices (e.g., dynamic memory and static memory).

Registration server 110 may include network interface 412, for communication with other computers (including wired and/or wireless communication) and/or for communication with network 106 (FIG. 1). In some examples, registration server 110 may include input/output interface(s) (e.g., such as a display device, a user interface, etc.).

In some examples, registration server 110 may include data storage device 410 storing instructions (e.g., software including registration application 418) for performing any one or more of the functions described herein. Data storage device 410 may include any suitable non-transitory computer-readable storage medium, including, without being limited to, solid-state memories, optical media and magnetic media.

The term "computer-readable storage medium" should be taken to include a single medium or multiple media that store one or more sets of instructions. The term "computer-readable storage medium" shall also be taken to include any medium that is capable of storing or encoding a set of instructions for execution by the machine and that causes the machine to perform any one or more of the methodologies of the present disclosure.

Registration application 418 may be configured to perform the functions described herein with respect to registration server 110 of system 100 (FIG. 1) and FIGS. 6-9 and 14. Registration verification application 420 may be configured to perform the functions described herein with respect to registration and verification server 1010 of system 1000 (FIG. 10) and FIGS. 11-14.

FIG. 5 illustrates a functional block diagram of an example monitoring server 114 (or monitoring server 1014 shown in FIG. 10) in the example form of a computer system within which a set of instructions for causing the machine to perform any one or more of the methodologies discussed herein, may be executed. Example monitoring server 114 may include processing device 502, memory 506, data storage device 510 and network interface 512, which may communicate with each other via data and control bus 514. In some examples, monitoring server 114 may also include input/output interface(s) 516. Processing device 502, memory 506 storing computer-readable instructions 508 executable by processing device 502, data storage device 510 and network interface 512 are similar to processing device 402, memory 406, data storage device 410 and network interface 412 (FIG. 4), except that processing device 502 may be configured to execute processing logic 504 (including monitoring application 418) for performing monitoring functions described with respect to FIG. 8). Although servers 110 and 114 are shown as separate machines, functions of servers 110 and 114 may be performed by one machine or may be distributed among multiple machines.

Figure 7:
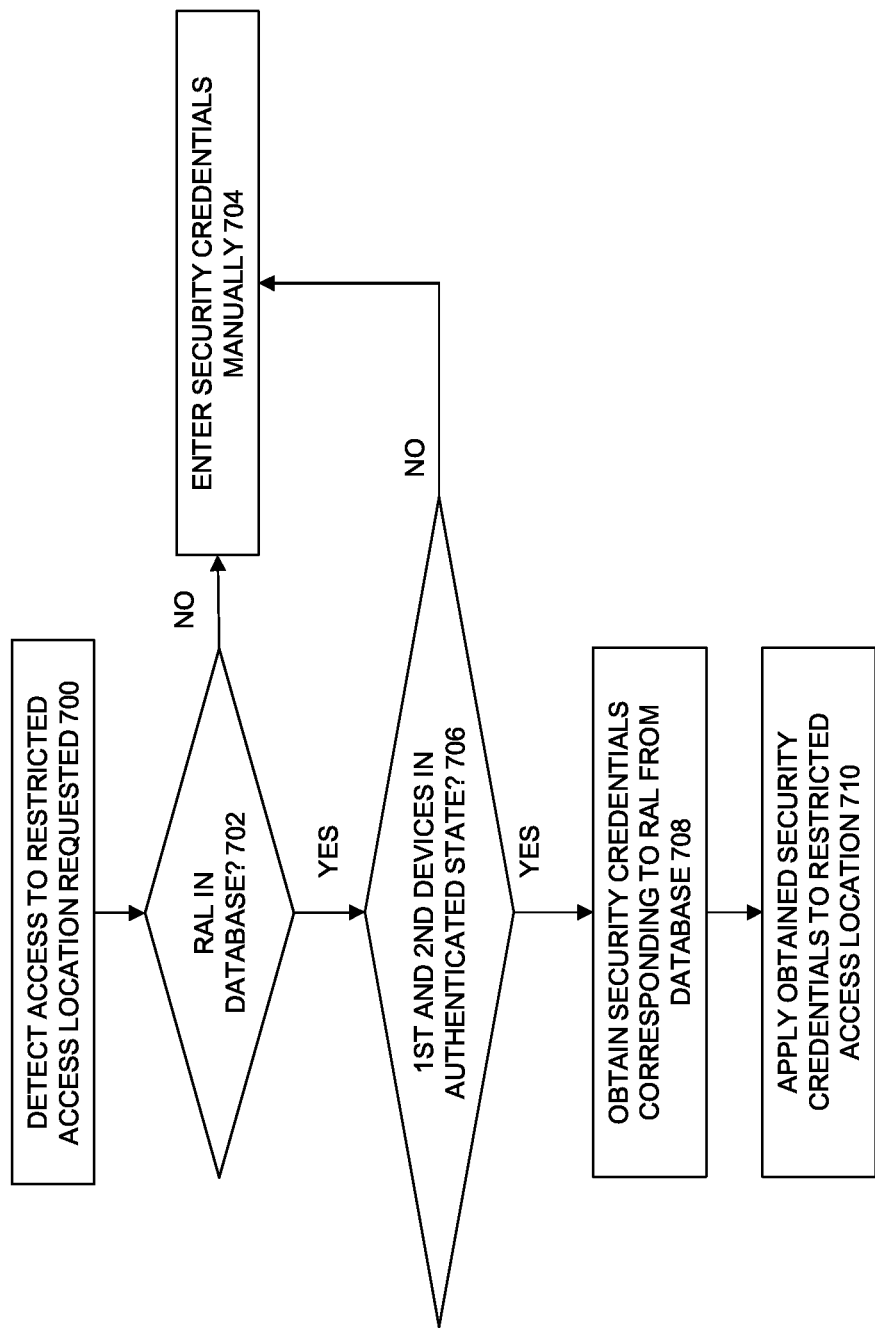
FIG. 7 is a flowchart diagram of an example method of operating the system shown in FIG. 1 for authorized access to a restricted access location, according to another aspect of the present disclosure.
Figure 8:
FIG. 8 is a flowchart diagram of an example method of operating the system shown in FIG. 1 for monitoring device usage in the authenticated state during access to various resources, according to an aspect of the present disclosure.
Figure 9:
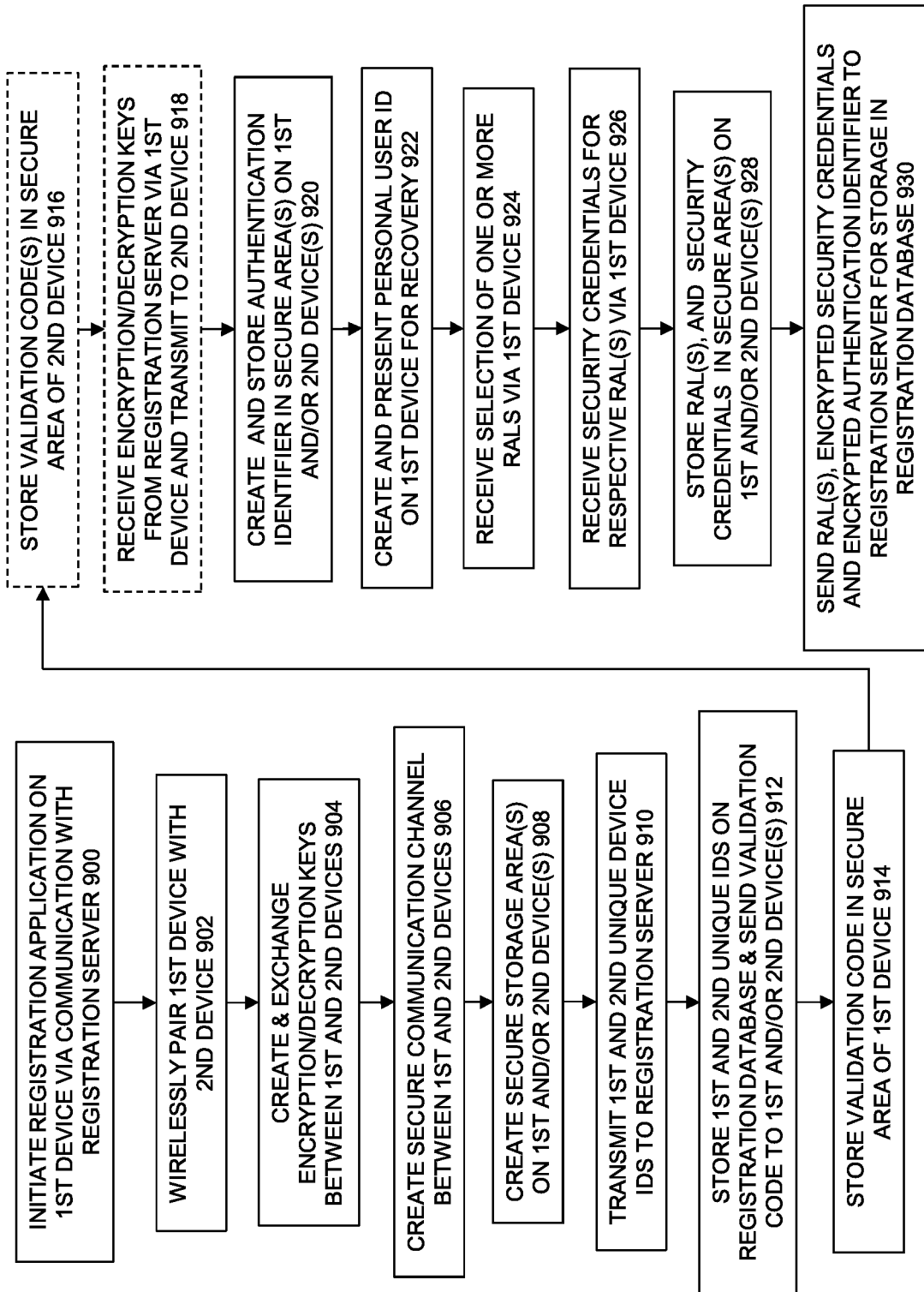
FIG. 9 is a flowchart diagram of an example method of registering a user for the system shown in FIG. 1, according to an aspect of the present disclosure.

Referring next to FIGS. 6-9, flow chart diagrams are shown representing example operations of system 100 including: initiating an authenticated state (FIGS. 6A-6C), operation of system 100 for authorized access to a restricted access location (FIG. 7), operation of system 100 for monitoring authorized use of first and second devices 102, 104 (and in some examples, use of a further electronic device) (FIG. 8) and registration of a user for system 100 (FIG. 9). In FIG. 6-9, it is understood that some of the steps may be performed by system 100 concurrently with other steps or a combination of steps, or may be performed in a different sequence than shown. It will also be understood that the steps shown in FIGS. 6-9 may be implemented by computer program instructions provided to a processor, including, for example, processor 202 executing secure access application 212, processor 302 executing secure access application 308, processing device 402 executing registration application 418 and processing device 502 executing monitoring application 518, respectively. The examples illustrated below generally describe the configuration where first device 102 is in communication with registration server 110 and first device 102 includes secure internal storage 204. It is understood that these are non-limiting examples, and that, in some examples, the illustrated processes may be performed where second device 104 is communication with registration server 110 and/or second device 104 includes secure internal storage 304.

Figure 6A:
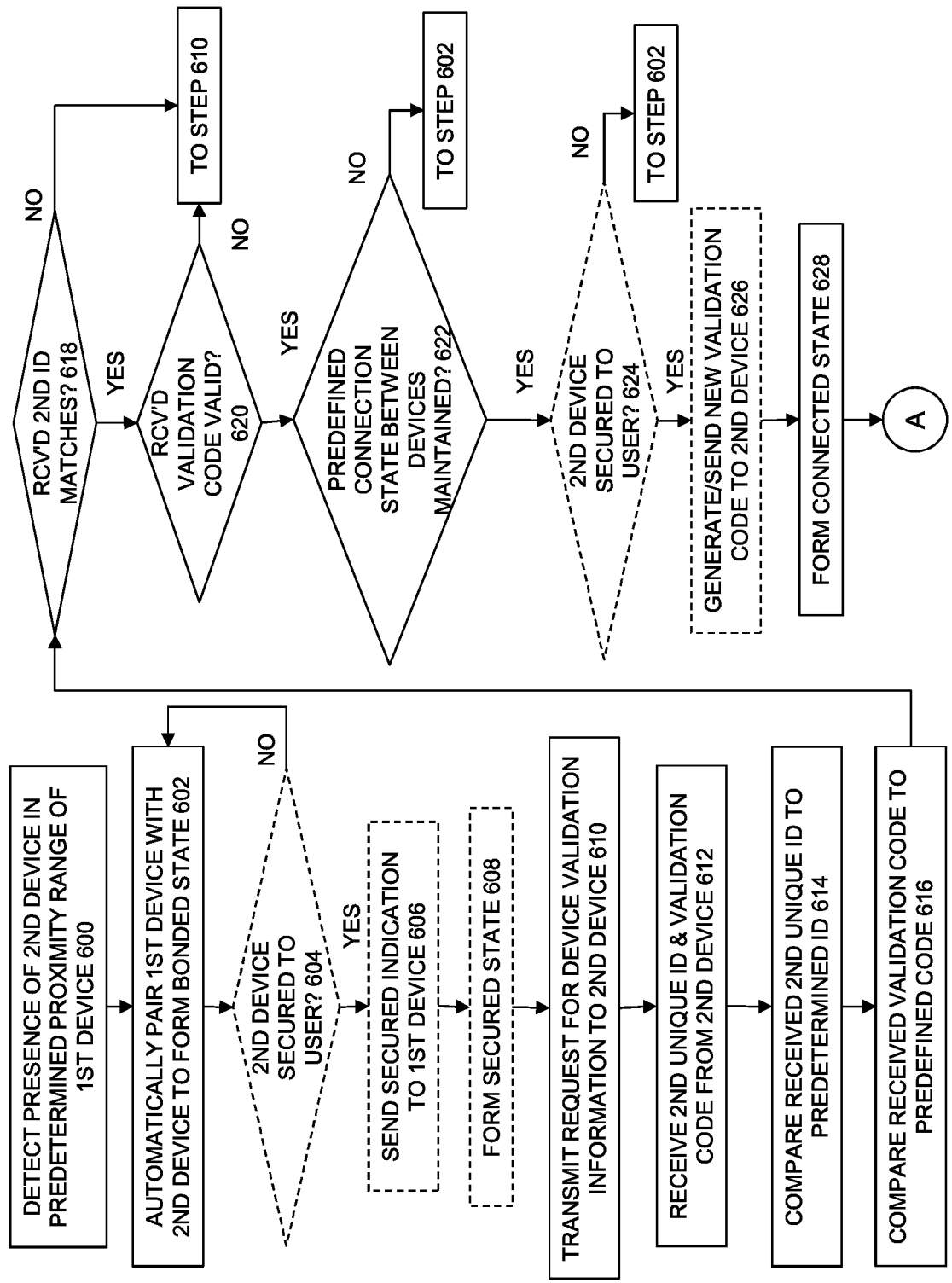
FIGS. 6A and 6B are flowchart diagrams of an example method of initiating an authenticated state between first and second electronic devices of the system shown in FIG. 1 to enable authorized access to restricted access locations, according to an aspect of the present disclosure.
Figure 6B:
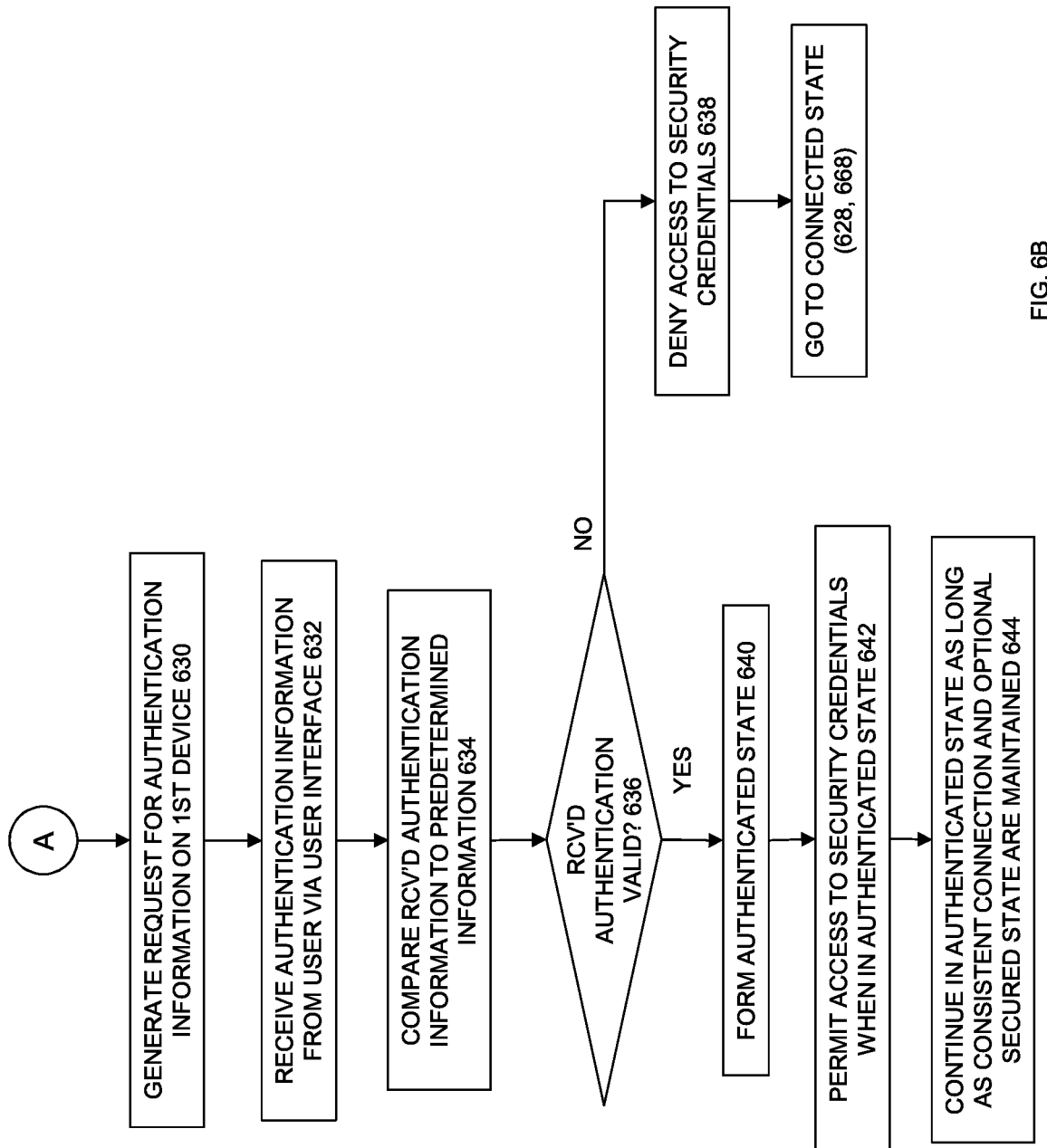

FIGS. 6A-6B are flow chart diagrams of an example method of initiating an authenticated state between first device 102 and second device 104, to enable authorized access to restricted access locations. At step 600, first device 102 may detect a presence of second device 104 within a predetermined proximity range of first device 102, for example by processor 202 using wireless communication interface 206. For example, first device 102 may detect a predetermined indication (e.g., a wireless signal) indicating second device 104. At step 602, first device 102 may automatically pair with second device 104 to form a bonded state. For example, first device 102 and second device 104 may exchange information (e.g., input/output capabilities) via a respective wireless communication interfaces 206, 306 and respective processors 202, 302. In some examples, first and second devices 102, 104 may form a bonded state according to a Bluetooth pairing and bonding protocol. In general, at step 602, first and second devices 102, 104 may establish a wireless secure communication channel therebetween, using encryption/decryption keys stored in secure storage 204 (or 304) or generated dynamically based on the specific wireless communication protocol. Thus, all subsequent communication between first and second devices 102, 104 may be performed via the secure (i.e., encrypted) communication channel.

In some examples, step 602 proceeds to optional step 604. At optional step 604, second device 104 may determine whether second device 104 is secured (or coupled) to a user. For example, processor 302 may receive an indication from optional physical locking mechanism 312 indicating that second device 104 is secured to the user. In other examples, processor 302 may detect that second device 104 is in contact with the user, such as using detected skin contact or other biometric data. When processor 302 of second device 104 determines that second device 104 is not secured to the user, optional step 604 proceeds to step 602. When processor 302 of second device 104 determines that second device 104 is secured to the user, optional step 604 may proceed to optional step 606. At optional step 606, second device 104 may send a secured indication to first device 102, for example, via respective wireless communication interfaces 206, 306. At optional step 608, processor 202 at first device 102 may form a secured state, responsive to the received secured indication (step 606). Optional step 608 may proceed to step 610.

In some examples, initiation of the authenticated state may not include formation of a secured state. In these examples, step 602 may proceed to step 610. At step 610, processor 202 of first device 102 may transmit a request for device validation information to second device 104, via wireless communication interface 206. At step 612, responsive to the request (step 610), first device 102 may receive second unique device ID 118 and a validation code from second device 104.

The validation code may be one of one or more validation codes generated by registration server 110 and sent to first device 102 and subsequently transmitted to second device 104 during a registration process (shown in FIG. 9). For example, a plurality of validation codes may be sent to second device 104 where each validation code may be valid for a predetermined time period (e.g., a time to live). In some examples, second device 104 may sequentially select and send one of the plural validation codes that is currently valid (based on the predetermined valid time period). In some examples, second device 104 may receive and store one validation code from first device 102 that may be periodically updated by first device 102 (such as in optional step 626).

At step 614, processor 202 may compare the received second unique device ID 118 to a predetermined ID stored in secure internal storage 204 (i.e., as part of security system information 228). At step 616, processor 202 may compare the received validation code to a predefined code stored in secure internal storage 204 (i.e., as part of security system information 228).

At step 618, processor 202 of first device 102 may determine whether the received second unique ID 118 matches the predetermined ID. When processor 202 determines that the received second unique ID 118 matches the predetermined ID, steps 618 proceeds to step 620. When processor 202 determines that the second unique ID 118 does not match the predetermined ID, step 618 proceeds to step 610.

At step 620, processor 202 of first device 102 determines whether the received validation code is valid, based on whether the received validation code matches the predefined code. When the received validation code is valid, step 620 proceeds to step 622. When processor 202 determines that the received validation code is invalid, step 620 proceeds to step 610.

At step 622, processor 202 of first device 102 determines whether a predefined connection state between first and second devices 102, 104 is maintained over the secure communication channel. The predefined connection state may include, without being limited to, a persistent connection (i.e., a connection where first device 102 and/or second device 104 may immediately detect a broken connection), an intermittent connection (i.e., a connection based on a user action) and/or a periodic connection (i.e., a connection based on a predetermined period of time) for which secure communication can be maintained between first and second devices 102, 104. When processor 202 of first device 102 determines that the predefined connection state is maintained, step 622 proceeds to optional step 624. When processor 202 determines that the predefined connection state is not maintained, step 622 proceeds to step 602.

At optional step 624, first device 102, may confirm that second device 104 is secured to the user. For example, processor 202 of first device 102 may request that second device 104 send a secured indication to first device 102. In other examples, processor 202 may assume that second device 104 is secured to the user based on the secure indication received in step 606, unless second device 104 sends a further indication to first device 102 that second device 104 is not secured to the user. When processor 202 of first device 102 determines that second device 104 is secured to the user, optional step 624 proceeds to optional step 626.

When processor 202 determines that second device 104 is not secured to the user, optional step 624 may proceed to step 602.

At optional step 626, processor 202 may generate and send a new validation code to second device 104 (that is also stored in secure storage 204 of first device 102). Step 626 may occur in those examples where first device 102 may periodically generate and send a new validation code to second device 104. Optional step 626 may proceed to 628.

At step 628, first device 102 may form a connected state with second device 104. Thus, when first and second devices 102, 104 are determined to be in the connected state, a secure communication channel exists between the devices (102, 104), a predefined communication state is maintained, and the second device information has been validated by first device 102. Step 628 proceeds to step 630 (FIG. 6B).

At step 630 (FIG. 6B), first device 102 may generate a request for authentication information via a user interface on first device 102. For example, processor 202 may request the input of authentication information via touch sensitive display system 222. At step 632, first device 102 may receive authentication information from the user via the user interface. At step 634, processer 202 may compare the received authentication information to predetermined information stored in secure internal storage 204. At step 636, processor 202 may determine whether the received authentication information is valid (based on step 634).

When processor 202 determines that the received authentication information is not valid, step 636 proceeds to step 638. At step 638, processor 202 may deny access to security credentials 224 stored in secure internal storage 204. Step 638 may proceed to step 628 (or step 668) such that the system 100 returns to the connected (but not authenticated) state.

When processor 202 determines that the received authentication information is valid, step 636 proceeds to step 640. At step 640, processor 202 forms the authenticated state. In general, the predetermined information for authentication may be generated during the registration process (FIG. 9). The identification information may be used to confirm that the user has previously registered and is authenticated to use system 100 for secure access to RALS 108 using a combination of first and second devices 102, 104.

At step 642, processor 202 of first device 102 may permit access to security credentials 224 in secure internal storage 204, when system 100 is in the authenticated state. At step 644, system 100 may continue in the authenticated state as long as the predefined connection state between first and second device 102, 104 is maintained and, optionally, the secured state is maintained.

Figure 6C:
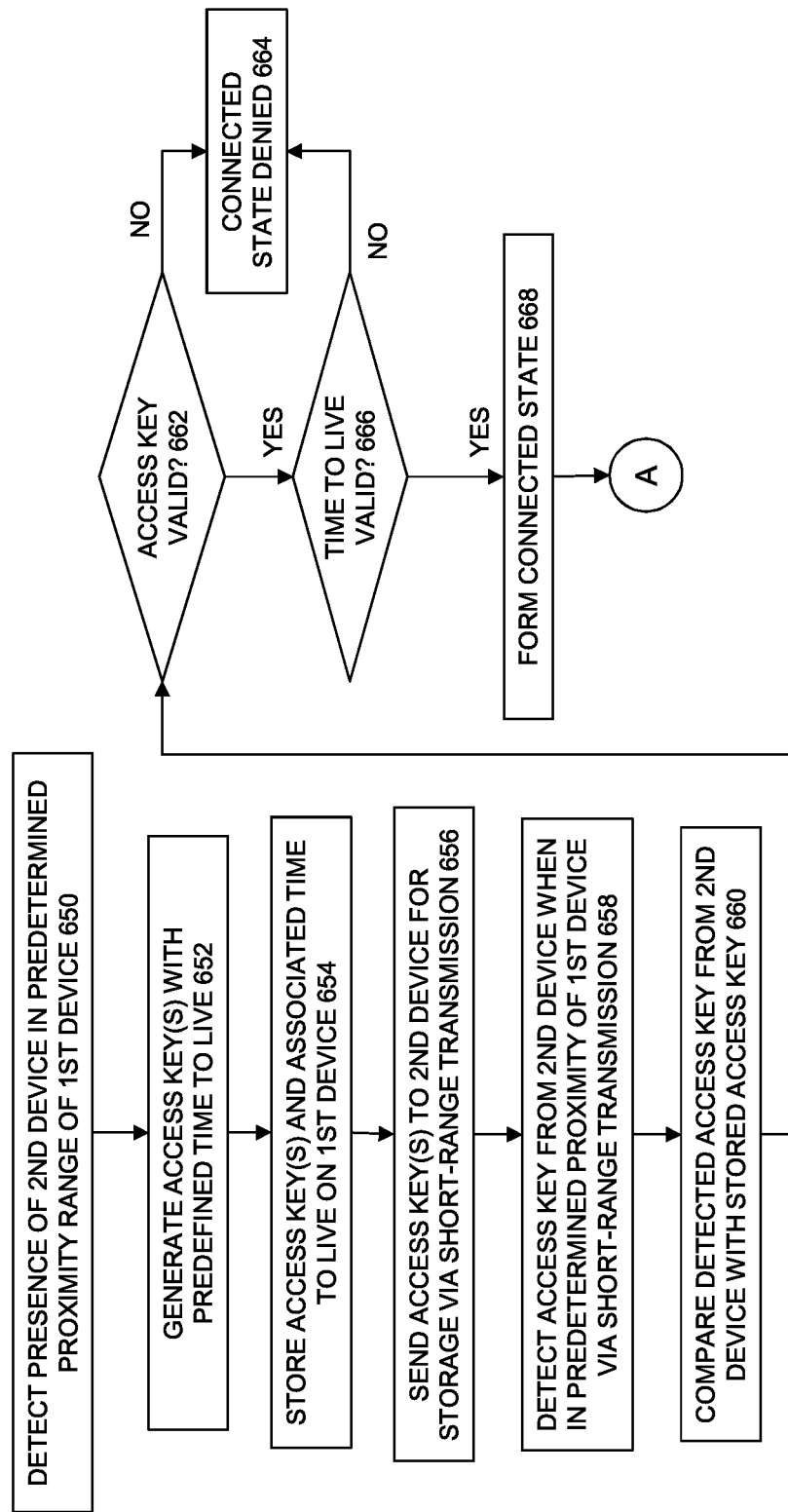
FIG. 6C is a flowchart diagram of an example method of initiating an authenticated state between first and second electronic devices of the system shown in FIG. 1 to enable authorized access to restricted access locations, according to another aspect of the present disclosure.

In general, FIGS. 6A and 6B describe a method for initiating an authenticated state when second device 104 is capable of operating in a battery dependent state. When second device 104 does not include battery 310 and/or battery 310 is not sufficiently powered, system 100 may initiate an authenticated state using a proximity dependent transmission protocol (e.g., near field communication (NFC)). FIG. 6C (in combination with FIG. 6A) illustrates an example of a proximity dependent method for initiating an authenticated state between first device 102 and second device 104.

At step 650, processor 202 of first device 102 detects a presence of second device 104 within a predetermined proximity range of first device 102. For example, when second device 104 is within the predetermined proximity range, first device 102 may power second device 104, e.g., via a NFC protocol. Responsive to being powered up by first device 102, second device 104 may transmit a predetermined indication (e.g., a wireless signal) indicating second device 104. First and second devices 102, 104 may then create a communication channel (while second device 104 is within the predetermined proximity range).

At step 652, processor 202 of first device 102 may generate one or more access keys with a predefined time to live. At step 654, processor 202 of first device 102 may store the access key(s) in secure internal storage 204 of first device 102 (e.g., as part of security system information 228). At step 656, processor 202 of first device 102 may send a copy of the access key(s) to second device 104 for storage in internal storage 304, for example, using short-range transmission (e.g., NFC) via respective wireless communication interfaces 206, 306.

At step 658, processor 202 of first device 102 may detect an access key from second device 104, when second device 104 is within the predetermined proximity range of first device 102, for example, via short-range transmission. At step 660, processor 202 may compare the detected access key from second device 104 with the stored access key in secure internal storage 204, to determine whether the detected access key is valid.

When processor 202 determines, at step 662, that the detected access key is not valid, step 662 proceeds to 664, and the connected state may be denied. In some examples, step 664 may proceed to step 650.

When processor 202 determines, at step 662, that the access key is valid, step 662 proceeds to step 666. At step 666, processor 202 of first device 102 may determine whether the time to live in the detected access key is valid. When the time to live is not valid, step 666 may proceed to step 664. When processor 202 determines, at step 666, that the time to live is valid, step 666 may proceed to step 668, and first and second devices 102, 104 may form a connected state. Step 668 proceeds to step 630 (FIG. 6B). Processor 202 of first device 102 may then perform steps 630-644, as described above with respect to FIG. 6B, to initiate the authenticated state for a proximity dependent second device 104. FIG. 6C illustrates an example proximity dependent method for initiating an authenticated state. In another example, access key(s) may be generated by first device 102 and transferred to second device 104 each time second device 104 is initially detected within the predetermined proximity range of first device 102 (step 650). The generated access key(s) may be used to form a connected state for as long as the second device 104 remains in proximity of first device 104, without assigning a time to live to the access key(s).

Referring next to FIG. 7, a flow chart diagram of an example method of operating system 100 for authorized access to a restricted access location is shown. At step 700, first device 102 may detect that access to a restricted access location is being requested. In some examples, the requested access may be requested directly by first device 102. In some examples, the requested access may be by a further electronic device coupled to first electronic device 102. For example, processor 202 may determine that a user is attempting to access a particular website or application that requires input of security credentials 224. At step 702, processor 202 of first device 102 may determine whether RAL information 226 related to the particular restricted access location is stored in secure internal storage 204 (and/or 304).

When it is determined, by processor 202, that RAL information 226 for the particular restricted access location is not stored in secure storage 204, step 702 may proceed to step 704. At step 704, a user may enter the security credentials manually, such as via a user input device.

When processor 202 determines, at step 702, that the associated RAL information 226 is stored in secure storage 204, step 702 may proceed to step 706. At step 706, processor 202 may confirm whether first and second devices 102, 104 are in the authenticated state. When it is determined that first and second devices 102, 104 are not in the authenticated state, step 706 may proceed to step 704.

When it is determined, at step 706, that first and second devices 102, 104 are in the authenticated state, step 706 may proceed to step 708. At step 708, processor 202 may permit access to security credentials 224 and may obtain security credentials 224 from secure internal storage 204 (and/or 304). At step 710, processor 202 may apply the obtained security credentials to gain access to the particular restricted access location.

As discussed above, RAL(S) 108 may include physical or virtual locations. FIG. 7 (and FIG. 13) may also be applied to a physical location, such as a physical access point (e.g., a door). Thus, at step 710 (or step 1310), application of the obtained security credentials (while in an authenticated state) may cause a locking mechanism at the physical access point to disengage, thereby permitting access to the physical access point.

Referring next to FIG. 8, a flow chart diagram of an example method of operating system 100 is shown for monitoring usage of first electronic device 102 in the authenticated state during access to various resources. At step 800, first device 102 may detect that access to a restricted access location has been initiated (e.g., at step 710 in FIG. 7). At step 802, first device 102 may confirm that first and second devices 102, 104 are still in the authenticated state. When first device 102 determines, at step 802, that first and second devices 102,104 are not in the authenticated state, first device 102 may terminate access to security credentials 224 on first device 102 (step 804).

When first device 102 determines, at step 802, that first and second devices 102, 104 are in the authenticated state, step 802 may proceed to step 806. At step 806, first device 102 may generate and transmit a device usage message to access monitoring server 114. The device usage message may include device usage information including, for example, first unique device identifier 116, a timestamp, an indication that first and second devices 102, 104 are in the authenticated state, and that first device 102 is currently being used to perform a task. In some examples, the device usage information may include information regarding a current resource being accessed by first device 102. In some examples, the device usage information may include device information of a further electronic device being used to perform a task.

At step 808, monitoring server 114 may store the device usage information, including a receipt in the device usage message in a database.

At step 810, first device 102 may periodically transmit a device usage message to monitoring server to indicate the current device usage information. At step 812, monitoring server 114 may store the device usage information in the currently received device usage message (transmitted at step 810).

The device usage information may be used to identify whether the first and second devices 102,104 continue to be used to perform tasks, maintain an authenticated state, access one or more resources and to confirm that an individual access resources continues to be the authorized user (as opposed to an imposter). One or more organizations may access the monitoring information at any suitable point in time to detect fraudulent usage (i.e., differentiate between a real user and an imposter). Although FIG. 8 is described with respect to first device 102 generating and transmitting device usage messages (steps 806, 810), in some examples, second device 104 may generate and transmit usage messages to monitoring server 114, such as when second device 104 includes network interface 307.

Referring next to FIG. 9, a flow chart diagram is shown of an example method of registering a user for system 100. At step 900, a registration application may be initiated on first device 102 via communication with registration server 110 over network 106. In some examples, the registration application may be initiated directly on first device 102. In some examples, the registration application may be initiated on first device 102 via a further electronic device (e.g., a laptop computer).

At step 902, first device 102 may be wirelessly paired with second device 104, for example, by positioning second device 104 within a predetermined proximity range of first device 102 to form a bonded state (e.g., such as via a Bluetooth protocol).

At step 904, first and second devices 102, 104 may create and exchange encryption/decryption keys between each other. At step 906, first and second devices 102, 104 may create a secure communication channel using the encryption/decryption keys (in step 904). In some examples at step 906, first electronic device 102 may receive encryption/decryption keys generated by registration server 110, may create a secret key from the received keys and transmit the secret key to second device 104. At step 906, first and second devices 102, 104 may create the secure communication channel using the secret key. All further communication between first device 102 and second device 104 may be performed using the secure communication channel according to the encryption/decryption keys created between first and second devices 102, 104.

At step 908, registration server 110 may cause secure storage areas 204, 304 to be created on respective first device 102 and second device 104. At step 910, first electronic device 102 may obtain second unique device ID 118 from second device 104 and transmit the first unique device 116 and second unique device ID 118 to registration server 110 via network 106. At step 912, registration service 110 may store the first and second unique device IDs 116, 118 on registration database 112. At step 912, registration server 110 may also send one or more validation codes to first device 102 and/or second device 104. Transmission of the validation code(s) to at least one of first device 102 and second device 104 may depend, for example, on which of first and second devices 102, 104 are in communication with registration server 110.

At step 914, first device 102 may store the received validation code(s) in a secure area (i.e., secure internal storage 204). At optional step 916, the validation code(s), received from registration server 110, may be stored in a secure area (i.e., secure internal storage 304) of second device 104, for example when second device 104 includes secure internal storage 304. At optional step 918, first electronic device 102 may receive encryption/decryption keys generated by registration server 110 and transmit the received keys to second device 104.

At step 920, first device 102 may create authentication identifier 120 associated with the user, and store authentication identifier 120 in one or more secure areas (i.e., secure internal storage 204 and/or 304) on first and/or second devices 102, 104. Authentication identifier 120 may authorize the user for authorized access to RALs 108 using system 100 (in the authenticated state) for the combination of first device 102 and second device 104. Authentication identifier 120 may be selected by the user, for example, via a user interface of first device 102 (or via a user interface on a further electronic device coupled to first device 102). In some examples, authentication identifier 120 may be selected by registration server 110. The selected authentication identifier 120 may be provided to first electronic device 102 and may be indicated to the user via a user interface of first device 102.

At step 922, first device 102 may create a personal user ID and present the personal user ID to a user (e.g., via a use interface of first device 102). In some examples, the personal user ID may include a random number generated multi-bit key (e.g., an 8 bit key, a 16 bit key, a 24 bit key, etc.). In some examples, first device 102 may create and present the personal user ID to a user, without storing the personal user ID in either of the secure storage areas (i.e., 204 and/or 304) of first device 102 and second device 104. The user may manually store the presented personal user ID (e.g., by manually entering the personal user ID into a paper record or into an electronic record). The personal user ID may be used for recovery of security credentials (described further below with respect to FIG. 14). Because the personal user ID may be presented to the user without being stored in the secure storage area(s), the user (and other non-authorized users) may be prevented from access to the personal user ID except when the ID is presented to the user at step 922. Thus, the user is only able to view the personal user ID during registration, and may use the manually stored ID (e.g., in the paper and/or electronic record) for recovery. In some examples, the personal user ID may be stored in another storage location separate from first and second devices 102, 104. In some examples, the personal user ID may be stored in another storage location on first device 102 and/or second device 104.

At step 924, first device 102 may receive a selection of one or more restricted access locations for storage in first device 102. In some examples, the selected restricted access location(s) may be input directly into first device 102 via a user interface. In some examples, the selected restricted access location(s) may be provided to first device 102 by a further electronic device. At step 926, first device 102 may receive security credentials for the respective restricted access location(s) (either directly or indirectly via a further electronic device).

At step 928, the received restricted access location(s) and security credentials may be stored in one or more secure areas of secure internal storage 204 and/or 304. At step 930, the restricted access locations (received in step 924), the security credentials (received in step 926) and the authentication identifier (created in step 920), may be sent to registration server 110 via first device 102 over network 106 for storage in registration database 112. In step 930, first device 102 may encrypt both the security credentials and the authentication identifier prior to transmission (e.g., via encrypter/decrypter 214).

Figure 10:
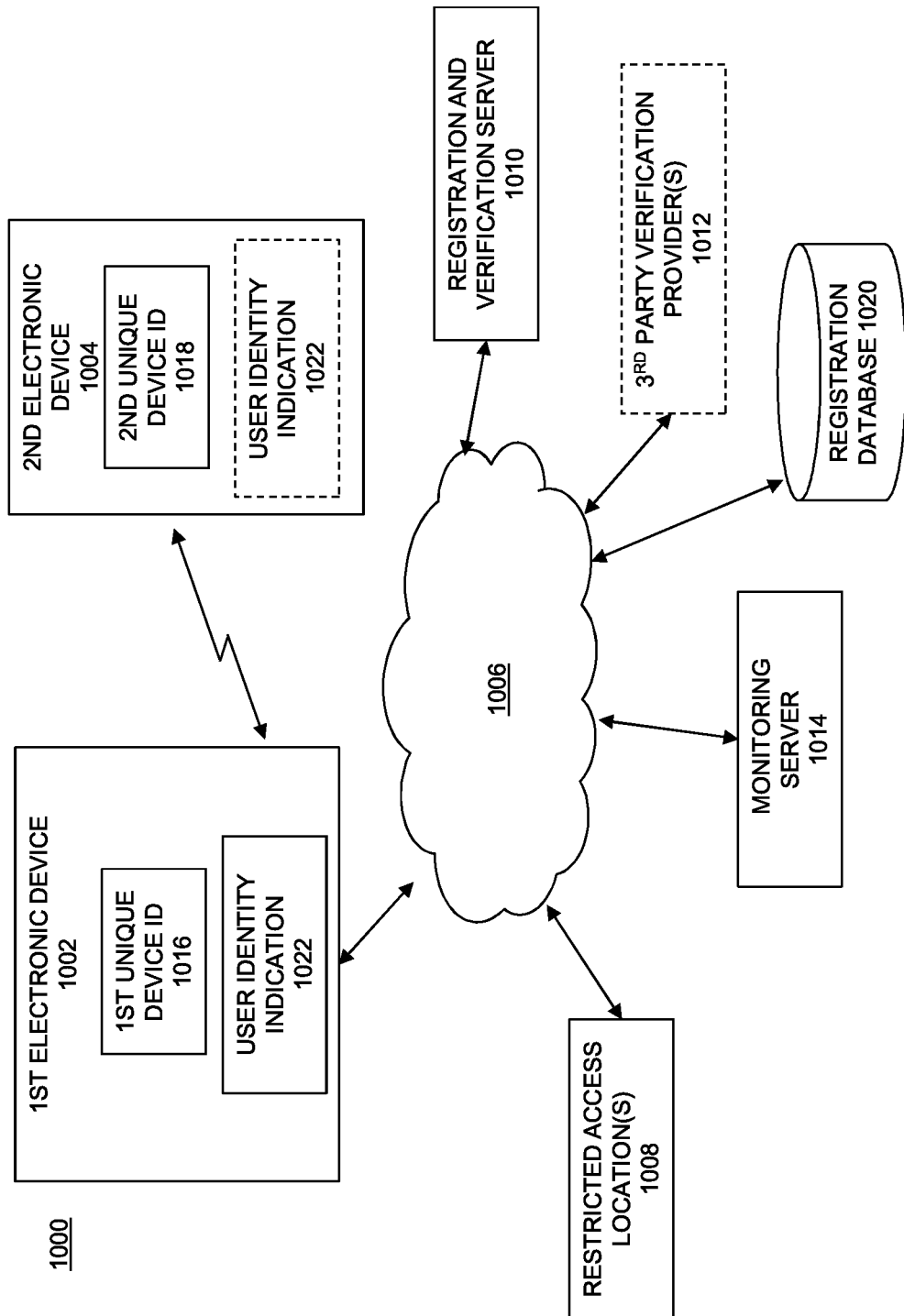
FIG. 10 is a functional block diagram of an example identity management and security system, according to another aspect of the present disclosure.

Referring next to FIG. 10, a functional block diagram of example identity management and security system 1000 is shown, according to aspects of the present disclosure. System 1000 may include first electronic device 1002 and second electronic device 1004. First device 1002 (and/or second device 1004) may be configured to communicate with one or more RALs 1008 via communication network 1006. First device 1002 may also be configured to communicate with registration and verification server 110 during a registration process (described further below with respect to FIGS. 11A and 11B). Registration and verification server 1010 may be configured to communicate with optional one or more third party verification provider(s) 1012 via network 1006. System 1000 may also include monitoring server 1014 for periodically monitoring session information and device information during access to various resources by first device 1002 (during an identified state). First device 1002 may be configured to store first unique device ID 1016 associated with first device 1002 and user identity information 1022. Second device 1004 may be configured to store second unique device ID 1018 associated with second device 1004. Although not shown in FIG. 10, in some examples, registration server 1010 and/or monitoring server 1014 may be configured to directly communicate with each of first electronic device 1002 and second electronic device 1004.

System 1000 is similar to system 100 (FIG. 1), except that system 100 may be configured to form an authenticated state (based on authentication identifier 120), whereas system 1000 may be configured to form an identified state (based on user identity verification). Thus, in system 1000, access to security credentials 224 in first device 1002 may be permitted when the user's identity is verified. This is in contrast to permitted access to security credentials 224 when it is confirmed that the user has registered with system 100 (i.e., authenticated).

First device 1002, second device 1004, network 1006, RAL(s) 1008, registration and verification server 1010, monitoring server 1014 and registration database 1020 are similar to respective first device 102, second device 104, network 106, RAL(s) 108, registration and verification server 110, monitoring server 114 and registration database 120 (FIG. 1). Although registration and verification server 1010 and monitoring server 1014 are shown as separate servers, in some examples, the functions of servers 1010 and 1014 may be included in a single server.

First device 1002 is different from first device 102 (FIG. 1) in that first device 1002 may store user identity information 1022 in secure internal storage 204 (e.g., as part of security system information 228), and may perform steps to verify the user's identity (either directly on first device 1002, via communication with registration and verification server 1010, third party verification provider(s) 1012 or any combination thereof) (described further below with respect to FIGS. 12A and 12B). Although the examples below describe storing user identity information 1022 in secure storage 204 of first device 1002, and using the user identity information 1022 stored on first device 1002 for verifying the user's identity, in some examples, user identity information 1022 may be stored in secure internal storage 304 of second device 1004 and used to verify a user's identity. In some examples, user identity information 1022 may be stored on both secure storage 204 of first device 1002 and secure storage 304 of second device 1004.

Figure 11A:
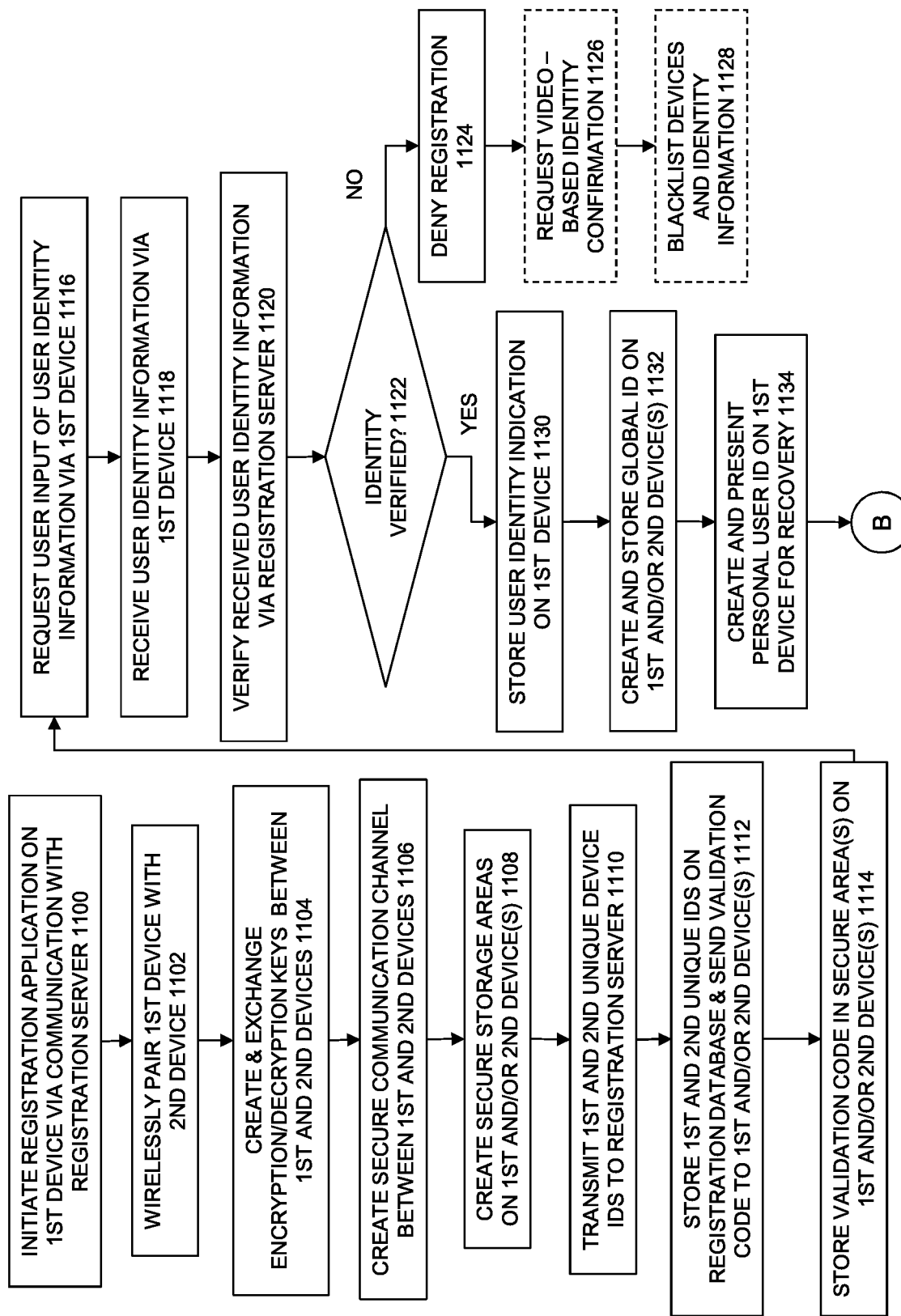
FIGS. 11A and 11B are flowchart diagrams of an example method of registering a user for the system shown in FIG. 10, according to an aspect of the present disclosure.
Figure 11B:
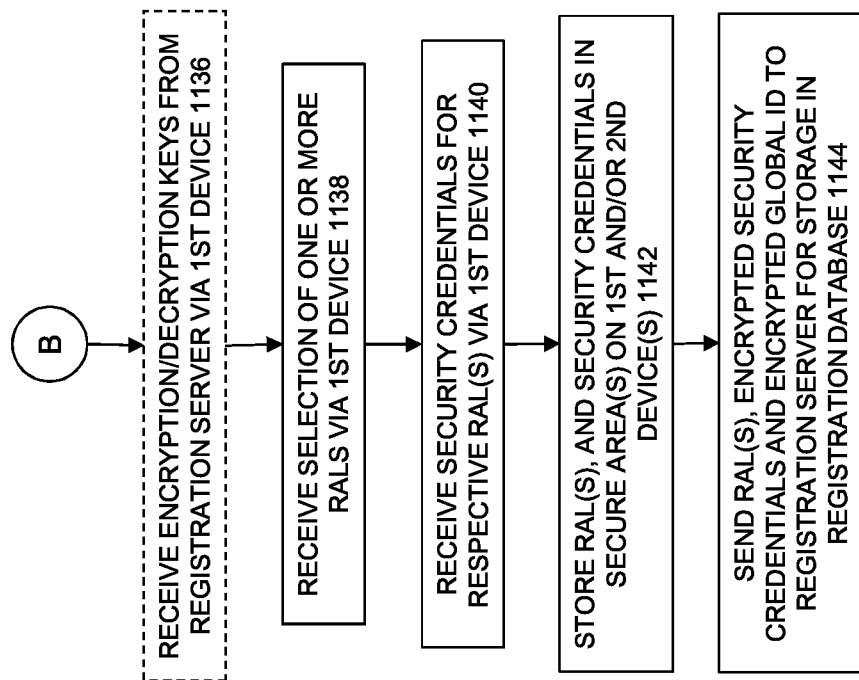
Figure 12A:
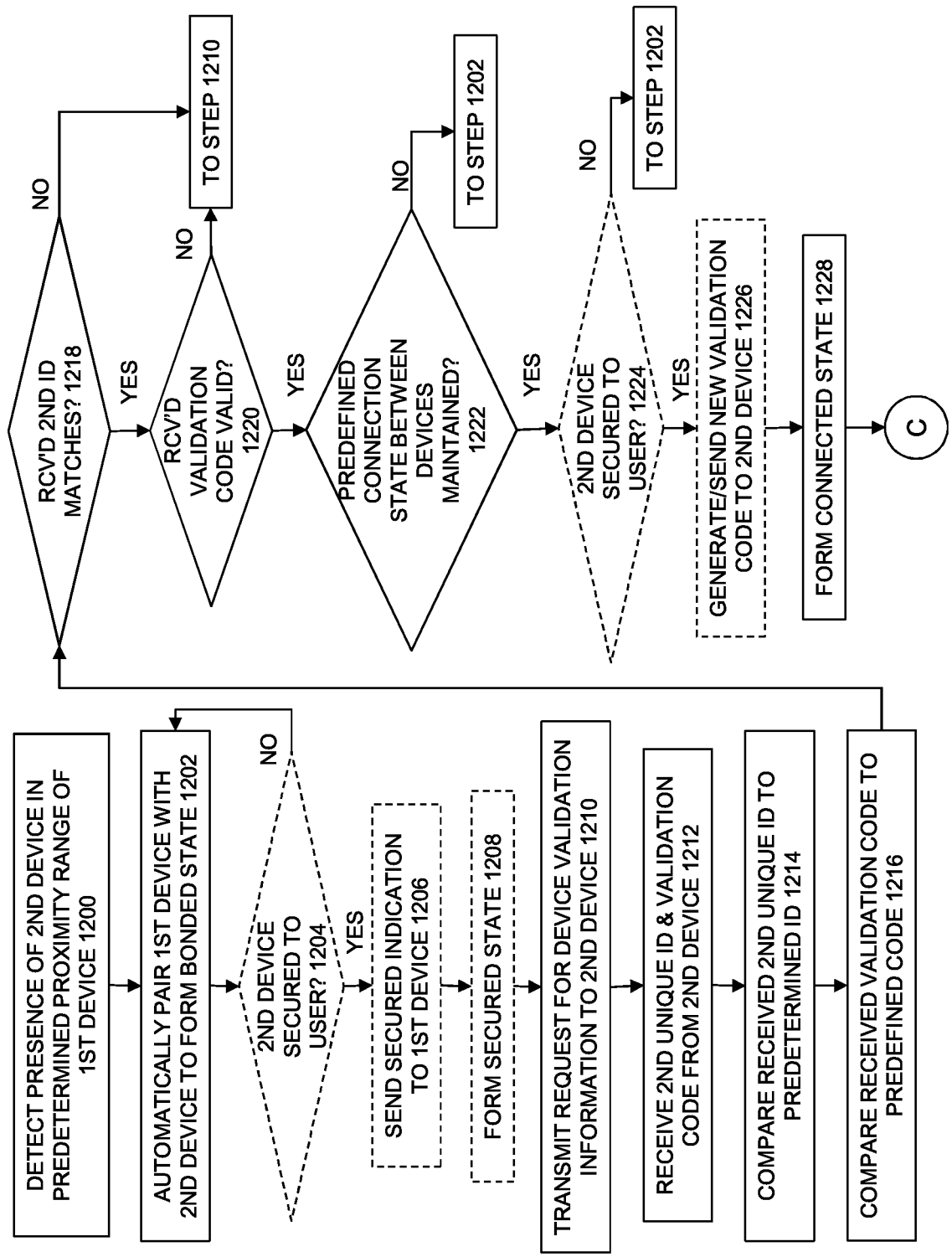
FIGS. 12A and 12B are flowchart diagrams of an example method of initiating an identified state between first and second electronic devices of the system shown in FIG. 10 to enable authorized access to restricted access locations, according to an aspect of the present disclosure.
Figure 12B:
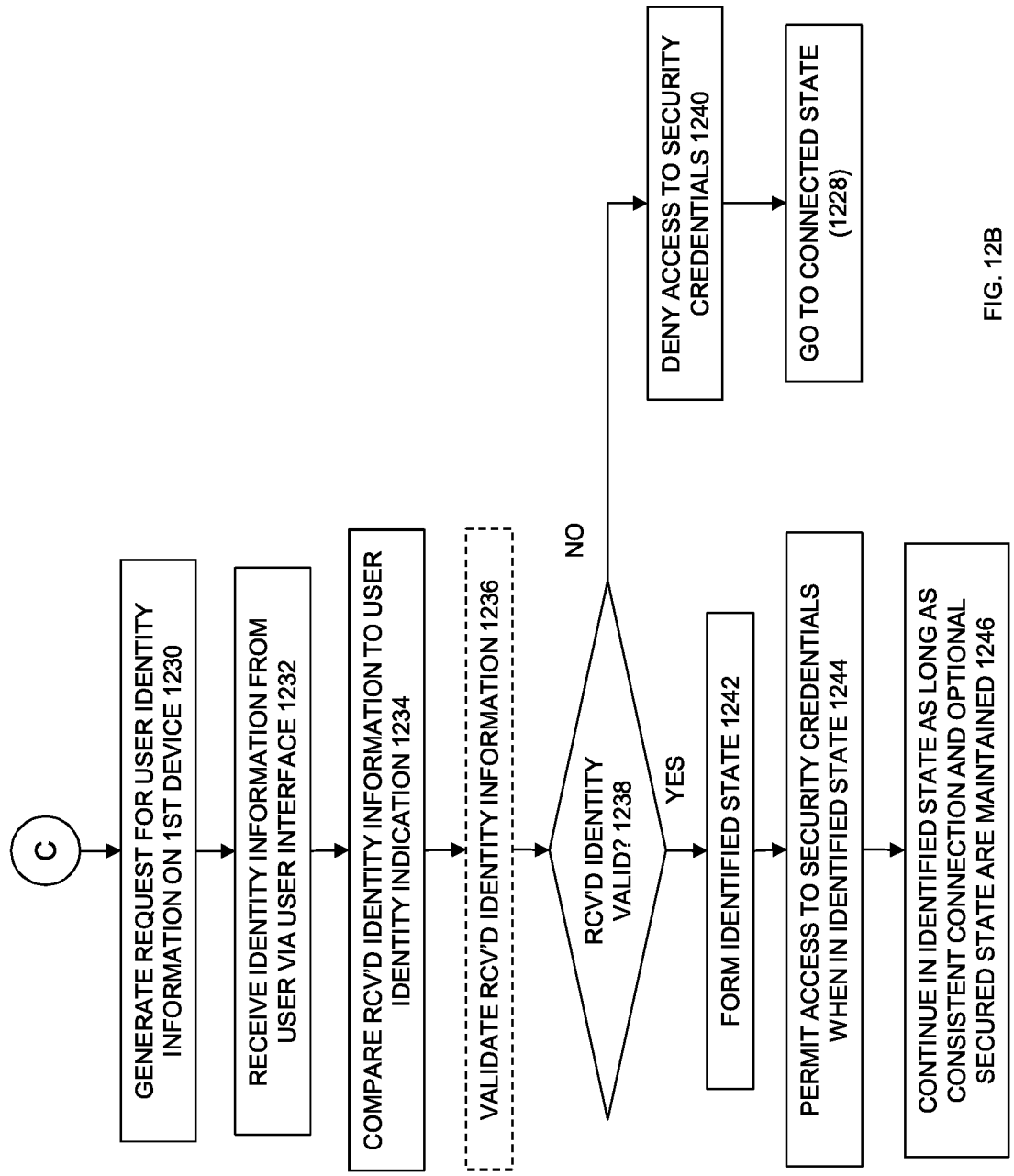

Registration and verification server 1010 is different from registration server 110 (FIG. 1) in that server 1010 may verify the user's identity during a registration process (described in FIGS. 11A and 11B) and, in some examples, during formation of the identified state for access to security credentials 224 on first device 1002 (described in FIGS. 12A and 12B).

Although not shown with respect to system 1000, first device 1002 and monitoring server 1014 may also monitor and store device usage information, as described in FIG. 8. Monitoring server 1014 is different from monitoring server 114 in that server 1014 may store identified state information as opposed to authenticated state information in received device usage messages (described in FIG. 8). Collectively, system 1000 may also provide a continuous multi-factor authentication (MFA) for access to RALs 1008. The continuous MFA in system 1000 uses multiple factors to identify a user and provide user access to RALs 108 (e.g., described further below with respect to FIGS. 12A-12C and FIG. 13) using first and second devices 102, 104. In addition, the continuous MFA repeatedly audits the provided access and this information (generated by the continuous MFA) may be used to prevent access to unauthorized users via monitoring server 1014.

System 1000 may validate user identify information that relates to the user's real identity. In general, the user identification information may include an established physical identify mechanism (EPIM). The EPIM may include any suitable mechanism, including, without being limited to, a government issued identity, a debit/credit card, an identity card, an account number, an employee email address, an employee ID, a customer ID, a supplier ID, etc. During registration of first and second devices 1002, 1004, the user may be requested to provide an EPIM, for example, via input using first device 1002. Server 1010, during registration, may verify the EPIM either directly or via communication with optional third party verification prover(s) 1012 (such as via a government organization, a financial institution, a telecommunication operator, an employer, a customer, a supplier, a private entity, a 3rd party verification service, etc.). In some examples, during formation of the identified state (FIGS. 12A and 12B), server 1010 directly and/or via optional provider(s) 1012 may also verify the EPIM of the user. In some examples, user identity indication 1022 stored on first device 1002 may include a multi-digit PIN associated with the EPIM (rather than the EPIM directly). The PIN may be confirmed during the registration process.

Figure 13:
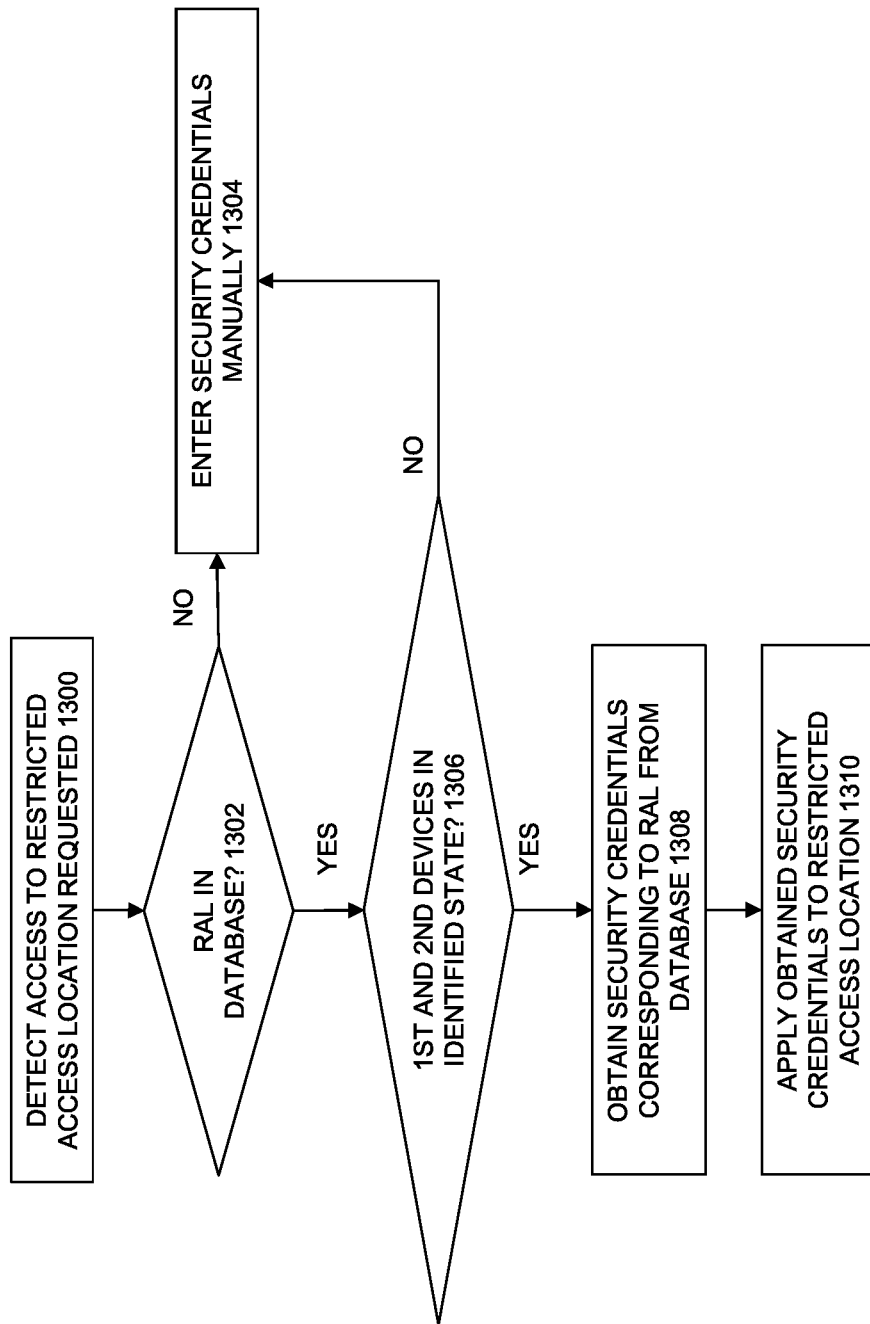
FIG. 13 is a flowchart diagram of an example method of operating the system shown in FIG. 10 for authorized access to a restricted access location, according to another aspect of the present disclosure.
Figure 14:
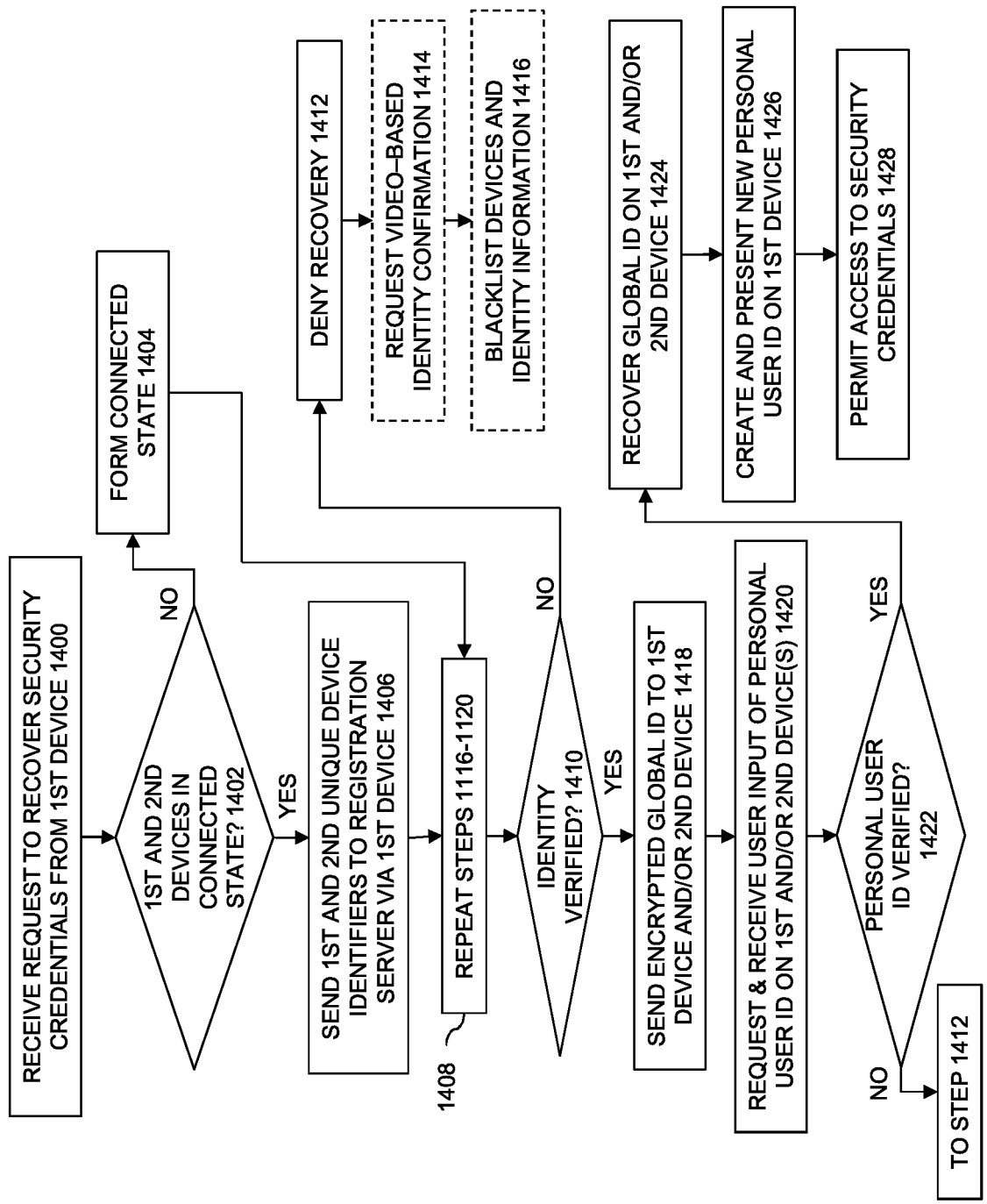
FIG. 14 is a flowchart diagram of an example method of operating the system shown in FIG. 10 for recovering security credentials, according to an aspect of the present disclosure.

Referring next to FIGS. 11-14, flow chart diagrams are shown representing example operations of system 1000 including: registration of a user for system 1000 (FIGS. 11A and 11B), initiating an identified state (FIGS. 12A and 12B), operation of system 1000 for authorized access to a restricted access location (FIG. 13), and operation of system 1000 for recovering security credentials (FIG. 14). In FIG. 11-14, it is understood that some of the steps may be performed by system 1000 concurrently with other steps or a combination of steps, or may be performed in a different sequence than shown. It will also be understood that the steps shown in FIGS. 11-14 may be implemented by computer program instructions provided to a processor, including, for example, processor 202 executing secure access application 212, processor 302 executing secure access application 308, processing device 402 executing registration application 420 and processing device 502 executing monitoring application 518, respectively. The examples illustrated below generally describe the configuration where first device 1002 is communication with registration server 1010 and first device 1002 includes secure internal storage 204. It is understood that these are non-limiting examples, and that, in some examples, the illustrated processes may be performed where second device 1004 is communication with registration server 1010 and/or second device 1004 includes secure internal storage 304.

Referring to FIGS. 11A and 11B, flow chart diagrams are shown of an example method of registering a user for system 1000. Steps 1100-1112 are similar to steps 900-912 in FIG. 9, described above. Step 1114 is similar to step 914 and optional step 916 in FIG. 9, described above.

At step 1116, server 1010, via first device 1002, may request user input of the user's identity information. The user identity information may include one or more EPIMs. In some examples, the user identity information may also include biometric information (e.g., a fingerprint, an eye scan, an image of the user, a voiceprint of the user, etc.). The user identity information may be provided via a suitable user interface, including a physical keyboard, a virtual keyboard, a camera, biometric input device 220, etc.

At step 1118, server 1010 may receive the user identity information input via first device 1002, for example, over network 1006. At step 1120, server 1010 may verify the received user identify information against established information associated with the user. Server 1010 may directly verify the identity information and/or verify the identify via one or more third party verification providers 1012.

At step 1122, server 1010 may determine whether the user's identity is verified. When server 1010 determines, at step 1122, that the identity is not verified, step 1122 may proceed to step 1124, and registration may be denied by server 1010. At optional step 1126, server 1010 may request video-based identity confirmation if the identity cannot be verified at step 1122. If the video-based identity confirmation (step 1126) is verified, optional step 1126 may proceed to step 1130. If the video-based identity confirmation cannot be verified, optional step 1126 may proceed to step 1124. At optional step 1128, server 1010 may blacklist devices and identity information when the identity cannot be verified at step 1120 (for example, if multiple attempts at registration fail).

When server 1010 verifies the user's identity information, step 1122 may proceed to step 1130. At step 1130, first device 1002 may store at least a portion of the identity information (received at step 1118) as user identity indication 1022 in secure storage 204. For example, user identity indication 1022 may include a multi-digit PIN associated with one or more EPIMs, a portion of EPIM information (i.e., less than all of the EPIM information), biometric information or any combination thereof. In some examples, storing a portion of the identity information on first device 1002 may be optional.

At step 1132, first device 1002 may create a global identifier (ID) for the user and store the global ID in secure storage area 204 and/or 304 (for example, depending upon which of first and second devices 1002, 1004 include a secure storage area). In some examples, the global ID includes a random number generated multi-bit key (e.g., an 8 bit key, a 16 bit key, a 24 bit key, etc.). In some examples, a global ID may also be assigned to a user during registration of system 100 (described with respect to FIG. 9 above). At step 1134, first device 1002 may create a personal user ID and present the personal user ID on first device 1002 (for example, on a user interface of first device 1002). In some examples, the personal user ID may include a random number generated multi-bit key (e.g., an 8 bit key, a 16 bit key, a 24 bit key, etc.). First device 1002 may associate the personal user ID with the global ID. In some examples, the personal user ID may be used to decrypt the global ID. In some examples, first device 1002 may create and present the personal user ID to a user, without storing the personal user ID in either of the secure storage areas (i.e., 204 and/or 304) of first device 1002 and second device 1004. As discussed above, the user may manually store the personal user ID in a paper and/or electronic record, for recovery of security credentials (described further below with respect to FIG. 14). In some examples, the personal user ID may be stored in another storage location separate from first and second devices 1002, 1004. In some examples, the personal user ID may be stored in another storage location on first device 1002 and/or second device 1004. Step 1134 may proceed to step 1136 (FIG. 11B).

Steps 1136-1142 (FIG. 11B) are similar to steps 918-928 (described above with respect to FIG. 9). At step 1144, the RAL(s), security credentials and global ID may be sent to registration server 1010 via first device 1002 over network 1006 for storage in registration database 1012. In step 1144, first device 1002 may encrypt both the security credentials and the global ID prior to transmission (e.g., via encrypter/decrypter 214).

Referring to FIGS. 12A and 12B, example flow chart diagrams are shown illustrating a method of initiating an identified state between first device 1002 and second device 1004 of system 1000 to enable authorized access to restricted access locations. In FIG. 12A, steps 1200-1228 are similar to steps 600-628 in FIG. 6A described above. In FIG. 12A, step 1228 proceeds to step 1230 (FIG. 12B).

At step 1230, first device 1002 may generate a request for user identity information via a user interface on first device 1002. For example, processor 202 may request the input of identity information via, for example, touch sensitive display system 222. At step 1232, first device 1002 may receive the requested identity information from the user via the user interface (for example, via touch sensitive display system 222, a camera, biometric input device(s) 220, etc.).

At step 1234, processor 202 of first device 1002 may compare the received identity information to user identity indication 1022 stored in secure internal storage 204. At optional step 1236, the received identity information may be validated by server 1010 (directly or in combination with third party verification provider(s) 1012. In some examples, step 1234 may not be performed, and only server 1010 (directly or indirectly) may validate the received identity information.

At step 1238, processor 202 of first device 1002 may determine whether the received identity information is valid (based on step 1234 and/or optional step 1236). When processor 202 determines that the received identity information is not valid, step 1238 may proceed to step 1240. At step 1240, processor 202 may deny access to security credentials 224 stored in secure internal storage 204. Step 1240 may proceed to step 1228 such that system 1000 returns to the connected(but not identified) state.

When processor 202 determines that the received identified information is valid, step 1238 may proceed to step 1244. At step 1244, processor 202 may form the identified state. In general, the received identity information may be used to verify the user identity and that the user is authorized to use system 1000 for secure access to RALS 1008 using a combination of first and second devices 1002, 1004.

At step 1246, processor 202 of first device 1002 may permit access to security credentials 224 in secure internal storage 204 (and/or 304), when system 1000 is in the identified state. At step 1246, system 1000 may continue in the identified state as long as the predefined connection state between first and second device 1002, 1004 is maintained and, optionally, the secured state is maintained.

First and second devices 1002, 1004 may also form an identified state for a proximity dependent method, as described above with respect to FIG. 6C.

Referring next to FIG. 13, a flow chart diagram of an example method of operating system 1000 for authorized access to a restricted access location is shown. At step 1300, first device 1002 may detect that access to a restricted access location is being requested. In some examples, the requested access may be requested directly by first device 1002. In some examples, the requested access may be by a further electronic device coupled to first electronic device 1002. For example, processor 202 may determine that a user is attempting to access a particular website or application that requires input of security credentials 224. At step 1302, processor 202 of first device 1002 may determine whether RAL information 226 related to the particular restricted access location is stored in secure internal storage 204 (and/or 304).

When it is determined, by processor 202, that RAL information 226 for the particular restricted access location is not stored in secure storage 204, step 1302 may proceed to step 1304. At step 1304, a user may enter the security credentials manually, such as via a user input device.

When processor 202 determines, at step 1302, that the associated RAL information 226 is stored in secure storage 204, step 1302 may proceed to step 1306. At step 1306, processor 202 may confirm whether first and second devices 1002, 1004 are in the identified state. When it is determined that first and second devices 1002, 1004 are not in the identified state, step 1306 may proceed to step 1304.

When it is determined, at step 1306, that first and second devices 1002, 1004 are in the identified state, step 1306 may proceed to step 1308. At step 1308, processor 202 may permit access to security credentials 224 and may obtain security credentials 224 from secure internal storage 204 (and/or 304). At step 1310, processor 202 may apply the obtained security credentials to gain access to the particular restricted access location.

As discussed above, RAL(S) 1008 may include physical or virtual locations. FIG. 13 may also be applied to a physical location, such as a physical access point (e.g., door). Thus, at step 1310, application of the obtained security credentials (while in an identified state) may cause a locking mechanism at the physical access point to disengage, thereby permitting access to the physical access point.

For example, during registration (see FIGS. 11A and 11B) for a physical access point (e.g., building door access), a user may verify their identity. Responsive to the verified identity, first electronic device 1002 and/or second electronic device 1004 may receive and store a unique key associated with the physical access point.

For example, a user may physically present user identity information user to a building management office. Upon identity check verification (e.g., via server 1010), a physical access control server (which may be server 1010 or a server associated with the physical access point in communication with server 1010), the physical access server may assign a unique key to the user and send the unique key to a physical access control read/write device (not shown). The user may position first and/or second electronic device 1002, 1004 within a predetermined proximity of the read/write device, and the read/write device may transfer the unique key to the first and/or second electronic device 1002, 1004, for example using a NFC protocol. The same key or a derived key may be stored on the physical access control server.

As another example, a user may submit user identity information (e.g., an employee ID or corporate email address), via network 1006 to server 1010. Responsive to identity verification by server 1010 and depending on the configuration of the physical access control system, the unique key may be generated by server 1010 or another server coupled to server 1010 (or may be generated by first or second electronic device 1002, 1004). The unique key may be stored on first and/or second electronic device 1002, 1004. The same unique key or a derived key may be stored on a physical access control server (not shown) associated with the physical access point).

Once the user has registered for the physical access point, access to the physical access point (e.g., the building door) may be obtained when the first and second electronic devices 1002, 1004 are in the identified state (see FIGS. 12A and 12B). For example, the user may position first and/or second electronic device 1002, 1004 within a predetermined proximity to a physical access control reader (associated with the physical access point). The reader requests authentication information from first and/or second electronic device 1002, 1004. While first and second electronic devices 1002, 1004 are in the identified state, access to the authentication information (i.e., security credentials) that is generated using the stored key is provided to the reader device. The authentication information is then verified, by communication of the reader with the physical access control server, to determine if access is permitted or is denied. When access is permitted, reader will permit entry to the physical access point (e.g., unlock a door). Each time the unique key is used to attempt access, the physical access server may send an indication to monitoring server 1014, and monitoring server 1014 may record the event and any associated information.

Referring next to FIG. 14, a flow chart diagram is shown of an example method of operating system 100 and/or 1000 to recover security credentials from first electronic device 102 (1002). In the description below, reference is made to system 1000 (FIG. 10) using first device 1002 and second device 1004. It is understood that the method shown in FIG. 14 may also be used with system 100 shown in FIG. 1.

At step 1400, a request to recover security credentials is received by server 1010 from first device 1002. At step 1402, server 1010 may confirm with first device 1002 that first and second devices 1002, 1004 are in the connected state.

When server 1010 determines that the first and second devices 1002, 1004 are not in the connected state, step 1402 proceeds to step 1404. At step 1404, first and second devices 1002, 1004 may be requested to form a connected state, by repeating steps 1200-1228 (FIG. 12A). When first and second devices 1002, 1004 form a connected state, step 1404 may proceed to step 1406.

When server 1010 determines, at step 1402, that first and second devices 1002, 1004 are in the connected state, step 1402 proceeds to step 1406. At step 1406, first device 1002 may send first and second unique device IDs 1016, 1018 to server 1010. At step 1408, steps 1116-1120 are repeated (see FIG. 11A).

At step 1410, server 1010 may determine whether the received user identity information is verified. When server 1010 determines that the identity information is not verified, step 1410 may proceed to step 1412. At step 1412, server 1010 may deny the recovery request. At optional step 1414, server 1010 may request that first device 1002 perform a video based identity confirmation. At optional step 1416, server 1010 may blacklist devices and identity information.

When server 1010 determines that the received identity information is verified, step 1410 proceeds to step 1418. At step 1418, server 1010 may transmit the global ID to first and/or second device(s) 1002, 1004. Server 1010 may encrypt the global ID that is sent to first and/or second device(s) 1002, 1004. At step 1420, first device 1002 (and/or second device 1004) may request user input of a personal user ID (previously generated by system 1000 during the registration process), and may receive the personal user ID via a user interface.

At step 1422, first device 1002 may determine whether the received personal user ID is verified (i.e., matches the previously generated personal user ID stored in secure internal storage 204 on first device 1002). When first device 1002 determines that the received personal user ID is not verified, step 1422 may proceed to step 1412.

When first device 1002 determines that the received personal user ID is verified, step 1422 may proceed to step 1424. At step 1424, the global ID may be recovered on first and/or second devices 1002, 1004 (based on step 1418). In some examples, the global ID may be recovered via decryption using the personal user ID. At step 1426, first device 1002 may create and present a new personal user ID to the user, for example, via a user interface. In some examples, the new personal user ID may be presented on a user interface of second device 1004. The user may view the new personal ID and manually store the new personal user ID for recovery, as discussed above. At step 1428, first and second devices 1002, 1004, are now in the identified state and access to security credentials 224 may be permitted. In some examples, database(s) for security credentials 224 and RAL(s) information 226 may be restored, based on user input of the previous personal user ID. For example, the previous personal user ID may be used to decrypt a backed up security credentials database.

While the present disclosure has been discussed in terms of certain embodiments, it should be appreciated that the present disclosure is not so limited. The embodiments are explained herein by way of example, and there are numerous modifications, variations and other embodiments that may be employed that would still be within the scope of the present invention.

The invention claimed is:

1. A security system comprising:
a first electronic device including a non-transitory memory storing computer-readable instructions and a processor;
a second electronic device associated with a unique device identifier, each of the first electronic device and the second electronic device including a wireless communication interface for wireless communication therebetween; and
a secure storage on at least one of the first electronic device and the second electronic device, the secure storage configured to store one or more security credentials associated with a user for authorized access to one or more restricted access locations;
wherein execution of the computer-readable instructions by the processor of the first electronic device causes the processor to:
detect a presence of the second electronic device within a predetermined proximity range of the first electronic device, based on an indication received from the second electronic device via the respective wireless communication interface,
establish a communication channel for subsequent communication between the first electronic device and the second electronic device via each wireless communication interface, responsive to the detected presence of the second electronic device, the communication channel established based on a cryptographic protocol between the first electronic device and the second electronic device according to a predefined relationship between the first electronic device and the second electronic device,
receive the unique device identifier from the second electronic device via the communication channel,
determine whether the received unique device identifier matches a predetermined identifier stored in the secure storage, to validate the second electronic device,
determine whether the first electronic device and the second electronic device maintain a predefined connection state over the communication channel, such that the communication channel is maintained, and
permit access to the one or more security credentials stored on the secure storage when the second electronic device is validated and the predefined connection state is maintained.

2. The system of claim 1, wherein the processor is further configured to establish the communication channel based on a predetermined wireless communication protocol.

3. The system of claim 1, wherein the communication channel includes a secure communication channel.

4. The system of claim 1, wherein the second electronic device includes a wearable device.

5. The system of claim 4, wherein the second electronic device includes a mechanism to detect coupling of the second electronic device to the user.

6. The system of claim 5, wherein the second electronic device transmits a secured indication to the first electronic device when the mechanism detects the coupling to the user, the first electronic device permitting access to the one or more security credentials when the second electronic device is validated, the predefined connection state is maintained and the secured indication is received.

7. The system of claim 1, wherein the processor is further configured to:
receive authentication information from the user via a user interface;
determine whether the authentication information for the user is valid, the authentication information indicating whether the user is authorized to use the first electronic device and the second electronic device; and
permit access to the one or more security credentials when the second electronic device is validated, the predefined connection state is maintained and the authentication information is valid.

8. The system of claim 7, wherein the system further includes a registration server coupled to the first electronic device via a communication network, the registration server configured to authorize the user for the first electronic device and the second electronic device.

9. The system of claim 8, wherein the registration server is configured to permit recovery of access to the one or more security credentials when the registration server verifies the authentication information.

10. The system of claim 1, wherein the system further includes a monitoring server coupled to at least one of the first electronic device or the second electronic device via a communication network, wherein at least one of the first electronic device or the second electronic device is configured to detect initiated access to one among the one or more restricted access locations and transmit a message to the monitoring server, the monitoring server storing device usage information in the message as received by the monitoring server.

11. The system of claim 10, wherein the at least one of the first electronic device or the second electronic device subsequently periodically transmits a message to the monitoring server including current device usage information.

12. The system of claim 10, wherein the system is configured to perform a continuous multi-factor authentication of the user via the first electronic device, the second electronic device and the monitoring server.

13. The system of claim 1, wherein at least one of first electronic device or the second device includes a computer, a mobile phone, a tablet, a smart watch, a health tracker, a fitness tracker, a multimedia device, a home automation system, an automated teller machine or a payment reader.

14. The system of claim 1, wherein the one or more restricted access locations include at least one of a virtual location or a physical location.

15. The system of claim 14, wherein one location among the one or more restricted access locations is configured to access the one or more security credentials, to permit or deny access to the one location.

16. A method for authorized access to one or more restricted access locations, the method comprising:
   storing, on a secure storage of at least one of a first electronic device and a second electronic device, one or more security credentials associated with a user for authorized access to the one or more restricted access locations;
   storing, on the second electronic device, a unique device identifier associated with the second electronic device, wherein each of the first electronic device and the second electronic device includes a wireless communication interface for wireless communication therebetween;
   detecting, by the first electronic device, a presence of the second electronic device within a predetermined proximity range of the first electronic device, based on an indication received from the second electronic device via the respective wireless communication interface;
   establishing, by the first electronic device, a communication channel for subsequent communication between the first electronic device and the second electronic device via each wireless communication interface, responsive to the detected presence of the second electronic device, the communication channel established based on a cryptographic protocol between the first electronic device and the second electronic device according to a predefined relationship between the first electronic device and the second electronic device;
   receiving, by the first electronic device, the unique device identifier from the second electronic device via the communication channel;
   determining, by the first electronic device, whether the received unique device identifier matches a predetermined identifier stored in the secure storage, to validate the second electronic device;
   determining, by the first electronic device, whether the first electronic device and the second electronic device maintain a predefined connection state over the communication channel, such that the communication channel is maintained; and
   permitting, by the first electronic device, access to the one or more security credentials stored on the secure storage when the second electronic device is validated and the predefined connection state is maintained.

17. The method of claim 16, wherein the second electronic device includes a wearable device, the method further comprising:
   detecting, by the second electronic device, coupling of the second electronic device to the user;
   transmitting, by the second device, a secured indication to the first electronic device when the coupling to the user is detected; and,
   permitting, by the first electronic device, access to the one or more security credentials when the second electronic device is validated, the predefined connection state is maintained and the secured indication is received.

18. The method of claim 16, the method further comprising:
   receiving, by the first electronic device, authentication information from the user via a user interface;
   determining, by the first electronic device, whether the authentication information for the user is valid, the authentication information indicating whether the user is authorized to use the first electronic device and the second electronic device; and
   permitting, by the first electronic device, access to the one or more security credentials when the second electronic device is validated, the predefined connection state is maintained and the authentication information is valid.

19. The method of claim 18, the method further comprising:
   receiving, by a registration server, a request for recovery of access to the one or more security credentials from at least one of the first electronic device or the second electronic device; and
   permitting, by the registration server, recovery of access to the one or more security credentials when the registration server verifies the authentication information.

20. The method of claim 16, the method further comprising:
   detecting, by at least one of the first electronic device or the second electronic device, initial access to one among the one or more restricted access locations; and
   transmitting, by at least one of the first electronic device or the second electronic device, a message to a monitoring server; and
   storing, by the monitoring server, device usage information included in the received message.

21. The method of claim 20, the method further comprising:
   periodically transmitting, by the least one of the first electronic device or the second electronic device, a message to the monitoring server including current device usage information.

22. The method of claim 16, wherein the one or more restricted access locations include at least one of a virtual location or a physical location, the method further comprising:
   receiving, by one location among the one or more restricted access locations, at least one credential among the one or more security credentials, when the access to the one or more security credentials is permitted; and
   permitting or denying, by the one location, access to the one location responsive to the received at least one credential.

23. The system of claim 1, wherein the predetermined identifier comprises a predetermined device identifier associated with the second electronic device.

24. The system of claim 1, wherein the predefined connection state comprises a persistent connection over the communication channel.

* * * * *